United States Patent
Larjo

(10) Patent No.: US 11,986,844 B2
(45) Date of Patent: May 21, 2024

(54) METHOD AND APPARATUS FOR MONITORING A FLOW FIELD OF A PARTICLE JET

(71) Applicant: OSEIR OY, Tampere (FI)

(72) Inventor: Jussi Larjo, Tampere (FI)

(73) Assignee: OSEIR OY, Tampere (FI)

(*) Notice: Subject to any disclaimer, the term of this patent is extended or adjusted under 35 U.S.C. 154(b) by 246 days.

(21) Appl. No.: 17/621,296

(22) PCT Filed: Jun. 11, 2020

(86) PCT No.: PCT/FI2020/050408
§ 371 (c)(1),
(2) Date: Dec. 21, 2021

(87) PCT Pub. No.: WO2020/260754
PCT Pub. Date: Dec. 30, 2020

(65) Prior Publication Data
US 2022/0355324 A1    Nov. 10, 2022

(30) Foreign Application Priority Data
Jun. 24, 2019  (FI) ...................................... 20195557

(51) Int. Cl.
*B05B 12/08*    (2006.01)
*G01P 3/38*    (2006.01)
*G01P 3/40*    (2006.01)

(52) U.S. Cl.
CPC .............. *B05B 12/082* (2013.01); *G01P 3/38* (2013.01); *G01P 3/40* (2013.01)

(58) Field of Classification Search
None
See application file for complete search history.

(56) References Cited

U.S. PATENT DOCUMENTS

| 9,964,495 B1 | 5/2018 | Marshall et al. |
| 2009/0065602 A1 | 3/2009 | Tapphorn et al. |

(Continued)

FOREIGN PATENT DOCUMENTS

| CA | 3027310 A1 * | 3/2018 | ............... B24C 1/00 |
| CA | 3027310 A1 | 3/2018 | |

(Continued)

OTHER PUBLICATIONS

European Patent Office, Extended European Search Report, Application No. 20833423.5, dated Jun. 22, 2023, 4 pages.

(Continued)

*Primary Examiner* — Alexander M Weddle
(74) *Attorney, Agent, or Firm* — Ziegler IP Law Group

(57) ABSTRACT

A method for controlling gas dynamic spraying includes providing a particle jet by using an accelerating nozzle, illuminating the particle jet with illuminating light pulses, capturing images of the particle jet illuminated with the illuminating light pulses, and determining one or more velocity values by analyzing the captured images, wherein the images are captured by using an imaging unit which includes imaging optics to form an optical image of an object plane on an image sensor by focusing light, wherein an optical axis of the imaging unit is inclined with respect to a central axis of the nozzle, and wherein the image sensor is inclined with respect to the optical axis such that the object plane is substantially parallel with a direction of movement of particles of the particle jet.

18 Claims, 20 Drawing Sheets

(56) References Cited

U.S. PATENT DOCUMENTS

2010/0151124 A1* 6/2010 Xue .......................... C23C 4/12
          239/398
2018/0254110 A1   9/2018 Ledford et al.

FOREIGN PATENT DOCUMENTS

| CN | 2816815 | 9/2006 |
| CN | 106226782 A | 12/2016 |
| WO | 2018046795 A1 | 3/2018 |

OTHER PUBLICATIONS

Finnish Patent and Registration Office, Office Action, Application No. 20195557, dated Jan. 8, 2020, 8 pages.
International Search Report, Application No. PCT/FI2020/050408, dated Sep. 7, 2020, 5 pages.
Li et al., "Investigation of turbulence structures in a drag-reduced turbulent channel flow with surfactant additive by stereoscopic particle image velocimetry", In: Experiments in Fluids, pp. 218-230, vol. 40, DOI: 10.1007/s00348-005-0061-1, 2006, 13 pages.
Meng et al., "Numerical and experimental investigation on effect of impact velocity on particle deposition characteristics in cold spraying", Materials Research Innovations, pp. 283-289, 2011, vol. 15, No. 4, 8 pages.
Written Opinion of The International Searching Authority, Application No. PCT/FI2020/050408, dated Sep. 7, 2020, 7 pages.

* cited by examiner

COMPARATIVE EXAMPLE

COMPARATIVE EXAMPLE

METHOD AND APPARATUS FOR MONITORING A FLOW FIELD OF A PARTICLE JET

FIELD

The aspects of the disclosed embodiments relates to controlling cold spray coating.

BACKGROUND

Objects may be coated by gas dynamic cold spraying. The cold spraying may comprise accelerating coating particles with a supersonic gas jet, and causing the particles to impact on a target object such that the particles undergo plastic deformation and adhere to the target. The size of the particles may be e.g. in the range of 1 to 50 µm, and the velocities of the particles may be e.g. in the range of 400 to 1200 m/s. The temperatures of the sprayed particles typically remain substantially below the melting temperature of said particles.

The properties of the formed coating may be measured e.g. by destructive or nondestructive testing. An effect of an operating parameter of the cold spraying on the properties of the coating may be determined e.g. by forming coatings by varying one or more operating parameters, by measuring the properties of the formed coatings, and by plotting the measured properties as a function of an operating parameter.

SUMMARY

Some versions may relate to a method for controlling cold spraying. Some versions may relate to an apparatus for forming a coating by cold spraying. Some versions may relate to a method for controlling operation of a cold spraying apparatus. Some versions may relate to a method for verifying operation of a cold spraying apparatus.

According to an aspect, there is provided a method for controlling gas dynamic spraying, wherein the method comprises:

providing a particle jet (JET0) by using an accelerating nozzle (NOZ1), illuminating the particle jet (JET0) with illuminating light pulses (LB0), capturing images (IMG1) of the particle jet (JET0) illuminated with the illuminating light pulses (LB0), and determining one or more velocity values (v(x)) by analyzing the captured images (IMG1), wherein the images (IMG1) are captured by using an imaging unit (200) which comprises imaging optics (210) to form an optical image of an object plane (O1) on an image sensor (SEN1) by focusing light, wherein an optical axis (AX2) of the imaging unit (200) is inclined ($\gamma$1) with respect to a central axis (AX0) of the nozzle (NOZ1), and wherein the image sensor (SEN1) is inclined ($\beta$1) with respect to the optical axis (AX2) such that the object plane (O1) is substantially parallel with a direction ($v_k$) of movement of particles (P0) of the particle jet (JET0).

The scope of protection sought for various embodiments of the present disclosure is set out by the independent claims. The embodiments and features, if any, described in this specification that do not fall under the scope of the independent claims are to be interpreted as examples useful for understanding various embodiments of the present disclosure.

A cold spraying apparatus may comprise the accelerating nozzle to provide a particle jet. The particle jet may be directed to a target object in order to form a coating by cold spraying. The particles of the particle jet may impact on a target object such that the particles undergo plastic deformation and adhere to the target object. A cold spraying operation may need to be verified e.g. when forming a coating on a critical part. A cold spraying operation may need to be verified e.g. when producing critical parts of an airplane.

The particle jet may be monitored by using a monitoring apparatus, which comprises an imaging unit. The imaging unit may be arranged to capture images of a measuring region of the particle jet. One or more captured images may be analyzed in order to count the number of detected particles and/or in order to determine velocities of detected particles. The monitoring apparatus may be arranged to determine one or more velocity values by analyzing the captured images. The monitoring apparatus may be arranged to determine one or more velocity distributions, wherein a velocity distribution may indicate velocity as a function of position.

The monitoring apparatus may be arranged to determine one or more number density values by analyzing the captured images. The monitoring apparatus may be arranged to determine one or more number density distributions, wherein a number density distribution may indicate number density as a function of position. The monitoring apparatus may also be arranged to calculate a mass flux value from a determined velocity value and from a determined number density value. The mass flux value may be indicative of a local deposition rate for forming a coating with the spraying apparatus.

A cold spraying operation may be controlled and/or verified based on one or more values measured by the monitoring apparatus. For example, one or more measured velocity values may be compared with reference data. A control operation for controlling the cold spraying may be carried out based on a result of the comparison. The control operation may comprise e.g. adjusting one or more operating parameters of the cold spraying. The control operation may comprise e.g. verifying a performed cold spraying operation to be valid or invalid, e.g. to accept or reject a coating formed on a target object.

The operation of the cold spraying apparatus may be verified by using an optical measuring device, which comprises an imaging unit. The imaging unit may be arranged to detect particles, which are moving within a measurement region. The measurement region may comprise an object plane. The imaging unit may be arranged to capture substantially sharp images of particles, which are moving in the vicinity of the object plane. The monitoring apparatus may be arranged to determine e.g. one or more velocity values by analyzing the captured images. The monitoring apparatus may be arranged to determine e.g. one or more velocity distributions. The monitoring apparatus may be arranged to determine e.g. one or more number density values. The monitoring apparatus may be arranged to determine e.g. one or more particle number density distributions. The monitoring apparatus may be arranged to calculate e.g. a mass flux value from a determined velocity value and from a particle number density value.

The distance between an accelerating nozzle and the target object may be short e.g. in order to maximize the velocities of the coating particles, to reduce consumption of accelerating gas and/or to facilitate accurate control of the particle jet. The distance between the accelerating nozzle and the target object may be short when compared with a width of the housing of the imaging unit.

The orientation of the imaging unit may be selected such that imaging unit may capture images of the particle jet also in a situation where the distance between an accelerating nozzle and the target object is short and/or in a situation where the measuring region is close to the target object. The imaging unit may be tilted in order to facilitate monitoring of a short particle jet. The imaging unit may be tilted in order to facilitate continuous monitoring of a short particle jet.

The angular orientation of the imaging unit may have an effect on the angular orientation of the object plane. The orientation of the object plane may have an effect on the capability of the imaging unit to the particles of the particle jet. The depth-of-field of the imaging unit may be small when compared with a diameter of the particle jet. Using an inclined orientation of an imaging unit may cause a situation where particles move rapidly through the measuring region such that optical images of the moving particles remain sharp only during a very brief period of time. The time period may be so short that it may be difficult to reliably detect the particles by analyzing a captured image. The time period may be so short that it may be difficult to accurately measure velocities of the particles by analyzing a captured image.

The image sensor may be inclined with respect to the optical axis of the imaging unit. The image sensor may have an inclined orientation so as to allow effective monitoring of a short particle jet. The image sensor may have an inclined orientation so as to allow effective monitoring of the particle jet close to the target object. An angle between the surface normal of the image sensor and the optical axis of the imaging unit may be substantially different from zero. When using the inclined image sensor, the velocity vectors of the moving particles may be substantially parallel with the object plane of the imaging unit. The inclined sensor may facilitate reliable detection of the particles by using an image recognition algorithm. The inclined sensor may allow using a longer exposure time for capturing images of the moving particles. The inclined sensor may allow using a longer temporal width of an illuminating pulse sequence. The inclined sensor may allow improving the accuracy of the so measurement of the velocities of the particles. The inclined sensor may provide improved spatial resolution in a transverse direction of the particle jet. The inclined sensor may allow measuring particle velocities close to the target object. The inclined sensor may allow measuring rate of change of particle velocities in the vicinity of the target object. Furthermore, the inclined sensor may facilitate detecting whether some particles bounce from the target object.

The monitoring of the particle jet may facilitate determining optimum operating parameters of the spray coating apparatus. The monitoring of the particle jet may improve quality and/or reliability of a coating formed a target object. Continuous monitoring may allow interrupting a coating process when one or more measured values are outside an acceptable range. The accelerating gas and/or the particles may be expensive. There is no need to continue an imperfect coating process if the target object will be rejected due to the problems which occurred during the coating process. Monitoring the particle jet may reduce costs spent on a target object, which will be rejected due to an imperfect coating.

A coating operation may be performed such that the particle jet is substantially continuously monitored during forming the coating. For example, the spraying gun may be moved with respect to a target object by using an actuator. The actuator may be e.g. an industrial robot. An imaging unit and an illuminating unit of the monitoring apparatus may be mechanically attached to the moving spraying gun, so as to ensure that the object plane of the imaging unit may continuously track the movements of the nozzle of the spraying gun. The imaging unit and an illuminating unit may be attached to the nozzle so that they move together with the nozzle.

The operating costs of the cold spraying apparatus may be high. The cost of the coating particles and/or the cost of working gas may be high. When using continuous monitoring, abnormal operation may be detected already during the coating operation. The monitoring apparatus may be arranged to provide e.g. an alarm when comparison of one or more measured velocity values with reference data indicates abnormal operation. One or more operating parameters of the coating process may be adjusted during the coating operation based on information obtained from the monitoring apparatus. A coating operation may be terminated e.g. in a situation where adjustment of the operating parameters does not restore normal operation. A coating operation may be terminated when abnormal operation is detected.

The central axis of the particle jet may sometimes be displaced with respect to an axis of symmetry of the accelerating nozzle of the spraying gun. Information about the position of the accelerating nozzle of the spraying gun may sometimes even be erroneous. In an embodiment, the method may comprise determining an actual position of the central axis of the particle jet based on one or more determined distributions. The method may comprise determining a center position of the particle jet e.g. by calculating a center of gravity of one or more determined distributions. The method may comprise determining an actual center position of the particle jet e.g. by fitting a function to one or more determined distributions.

The method may comprise communicating information about the determined position of the central axis of the particle jet to a control system of the cold spraying apparatus. The control system of the cold spraying apparatus may be arranged to use the information about the determined position of the central axis of the particle jet to adjust and/or correct the position of the particle jet with respect to the target object. Information about the actual center of the particle jet may facilitate more accurate control of local thickness of the coating formed on a target object.

BRIEF DESCRIPTION OF THE DRAWINGS

In the following examples, several variations will be described in more detail with reference to the appended drawings, in which.

DETAILED DESCRIPTION

Figure 1A:
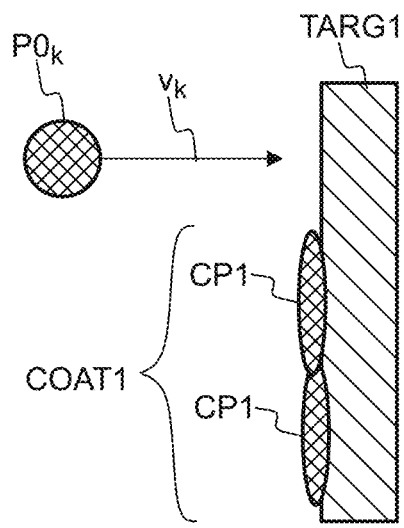
FIG. 1a shows, by way of example, in a cross-sectional view, forming a coating on an object by gas dynamic cold spraying.

Referring to FIG. 1a, a coating particle $P0_k$ of a particle jet JET0 may move at a velocity $v_k$. The particle $P0_k$ may be deformed when it impinges on the surface of a target object TARG1. The particles P0 of the jet JET0 may be converted into deformed coating particles CP1. A plurality of coating particles CP1 may be adhered to the target object TARG1. A plurality of coating particles CP1 may together constitute a coating COAT1. The target object TARG1 may be e.g. a component of an engine, a component of a gas turbine, and/or a component of an aircraft.

Figure 1B:
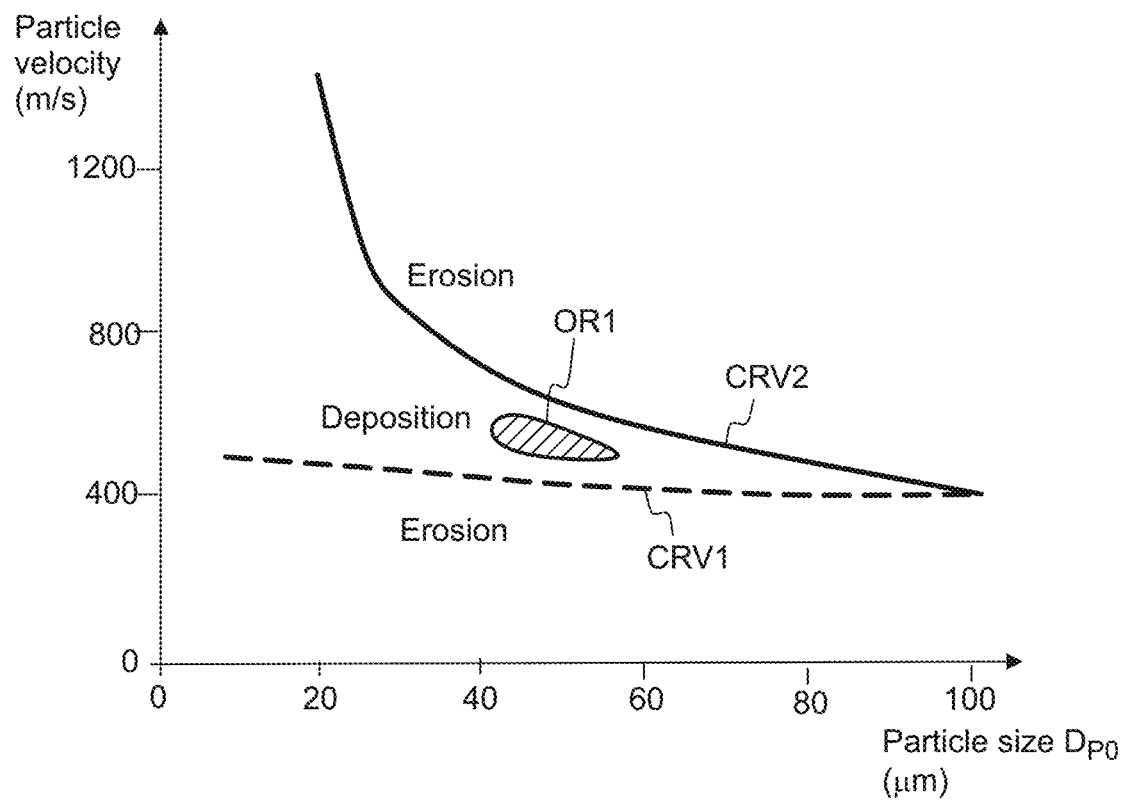
FIG. 1b shows, by way of example, minimum and maximum velocities for forming a coating with coating particles of different sizes.

Referring to FIG. 1b, a suitable velocity range for forming a coating may depend on the particle size DIDO. The lower curve CRV1 may represent a minimum velocity limit, and the higher curve CRV2 may represent a maximum velocity limit. A suitable velocity range for forming a coating may reside between the upper curve CRV2 and the lower curve CRV1. Velocities lower than the limit CRV1 and velocities higher than the limit CRV2 may cause erosion of the target object TARG1 and/or erosion of a previously formed coating COAT1.

A coating process may have an optimum region OR1. A coating having desired properties may be formed by providing the particle jet such that the particle velocity and the particle size reside within the optimum region OR1. The optimum region may depend e.g. on the material of the particles and on the material of the target object.

A cold spray coating operation may be determined to be valid e.g. if at least a predetermined percentage of the particles of the particle jet reside within the optimum region OR1.

The cold spray coating operation may be determined to be invalid e.g. if less than a predetermined percentage of the particles of the particle jet reside within the optimum region OR1.

Figure 1C:
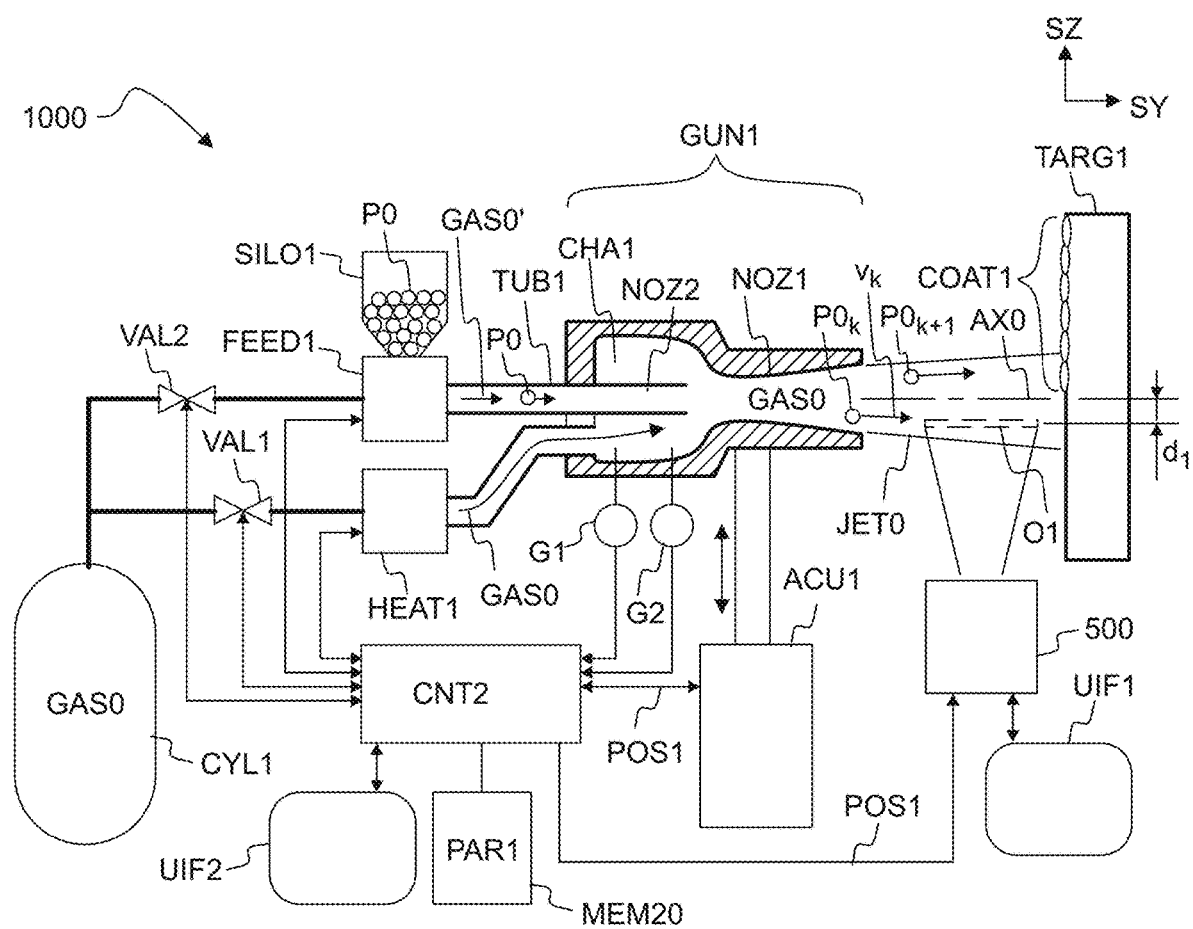
FIG. 1c shows, by way of example, a coating apparatus, which comprises an optical monitoring apparatus.

Referring to FIG. 1c, a coating apparatus 1000 may comprise an optical measuring device 500 for measuring one or more velocity values of the particle jet JET0. One or more measured values may be compared with reference data, and a spraying operation may be controlled based on a result of the comparison. In particular, the measuring device 500 may measure velocity distributions of the particle jet JET0. A measured distribution may be compared with a reference distribution, and a spraying operation may be controlled based on a result of the comparison.

The apparatus 1000 may provide a particle jet JET0 by accelerating particles P0 to a high velocity. The apparatus 1000 may comprise an accelerating nozzle NOZ1 to accelerate working gas GAS0 to a high velocity. The accelerating nozzle NOZ1 may be e.g. a diverging nozzle, which may be arranged to accelerate the working gas to supersonic velocities, i.e. to velocities higher than the speed of sound. The diverging nozzle may be e.g. a de Laval nozzle. The particles P0 may be guided to the working gas GAS0 via a feeding nozzle NOZ1. The accelerated working gas GAS0 may, in turn, accelerate the particles P0 to a high velocity. The accelerated particles P0 may together constitute a particle jet JET0. The accelerating nozzle NOZ1 may provide a particle jet JET0, which comprises a plurality of particles $P0_k$, $P0_{k+1}$, $P0_{k+2}$, ... moving at high velocities $v_k$, $v_{k+1}$, $v_{k+2}$, .... The nozzle NOZ1 may have a central axis AX0 of symmetry.

The particles P0 of the particle jet JET0 may impinge on a target object TARG1, so as to form a coating COAT1. The apparatus 100 may comprise an actuator ACU1 to cause a relative movement between the nozzle NOZ1 and the target object TARG1, e.g. in order to form a coating on a large area of a target object TARG1. In particular, the actuator ACU1 may be arranged to move the nozzle NOZ1.

The working gas GAS0 may be provided e.g. from a gas cylinder CYL1. The working gas GAS0 may be e.g. helium or nitrogen. The apparatus 1000 may comprise a valve VAL1 for controlling flow rate and/or pressure of the working gas GAS0. The apparatus 1000 may comprise a heater HEAT1 to heat the working gas GAS0. The working gas GAS0 may be guided to the nozzle NOZ1 via a plenum chamber CHA1. The apparatus 1000 may comprise a particle feeding unit FEED1 to feed coating particles P0 to the particle jet JET0 at a controlled flow rate. The apparatus 1000 may comprise a container SILO1 to provide particles P0 to the feeding unit FEED1.

The apparatus 1000 may comprise one or more sensors G1, G2 to monitor the pressure and/or temperature of the heated working gas GAS0. The apparatus 1000 may comprise a feeding nozzle NOZ2 to guide particles P0 received from the feeding unit FEED1 into the particle jet JET0. The particles may be carried from the feeding unit FEED1 to the nozzle NOZ2 by using carrier gas GAS0'. For example, a partial flow of the working gas GAS0 may be used as the carrier gas GAS0' to carry the particles from the feeding unit FEED1 into the particle jet JET0. The apparatus 1000 may comprise a valve VAL2 to control flow rate and/or pressure of the carrier gas flow. The particles P0 and the carrier gas may be guided from the feeding unit to the feeding nozzle NOZ2 via a duct TUB1.

The accelerating nozzle NOZ1, the plenum chamber CHA1, and the feeding nozzle NOZ2 may together constitute a unit GUN1, which may be called e.g. as a spraying gun.

The apparatus 1000 may comprise a control unit CNT2 to control operation of the spraying gun GUN1. For example, the control unit CNT2 may be arranged to control operation of the apparatus 1000 according to selected operating parameters PAR1. The operating parameters PAR1 may be e.g. flow rate of working gas, pressure of working gas, temperature of working gas, flow rate of particles, and/or a trajectory for moving the nozzle NOZ1. The operating parameters PAR1 may be stored e.g. in a memory MEM20.

The apparatus 1000 may comprise a user interface UIF2 for providing information to a user and/or for receiving user input.

The apparatus 1000 may provide position information POS1 indicative of the position of the nozzle NOZ1 with respect to the target TARG1.

The measuring device 500 may receive position information POS1 from the apparatus 1000. The position information POS1 may be indicative of a transverse position of the axis AX0. The position information POS1 may be received e.g. from the actuator ACU1, from a position sensor of the actuator ACU1, and/or from a control unit CNT2 of apparatus 1000. The position information POS1 may also be indicative of a relative position of the object plane O1 with respect to the axis AX0 of the nozzle NOZ1, e.g. in a situation where the actuator ACU1 may move the nozzle with respect to the imaging unit 200 of the measuring device 500.

The apparatus 1000 may comprise an optical measuring device 500 for measuring one or more distributions of the particle jet JET0. The measuring device 500 may be arranged to detect particles which are moving in the vicinity of an object plane O1 of the optical measuring device 500.

The symbol $d_1$ may denote the distance between the object plane O1 and the axis AX0 of the nozzle NOZ1. SX, SY and SZ may denote orthogonal directions. The direction SY may be parallel with the direction of the axis AX0 of the nozzle NOZ1. The direction SX may be called e.g. as a lateral direction. The direction SZ may be called e.g. as a transverse direction.

The monitoring device 500 may comprise a user interface UIF1 e.g. for displaying a measured velocity values to a user and/or for receiving user input from a user. The user interface UIF1 may display e.g. a determined distribution to a user.

Figure 1D:
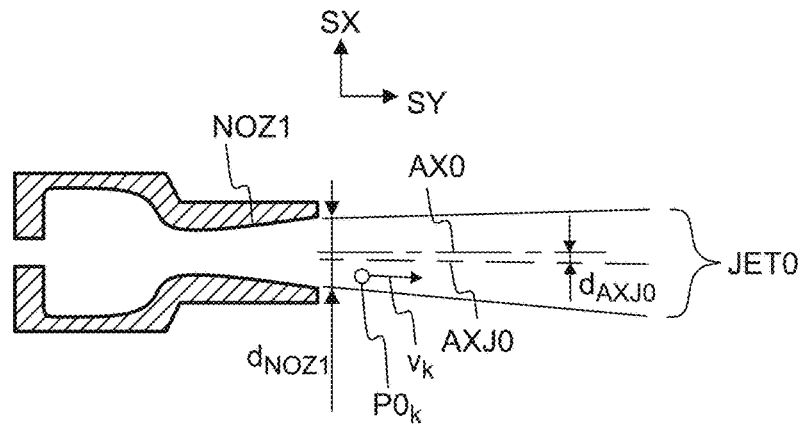
FIG. 1d shows, by way of example, an axis of the nozzle and an axis of the particle jet.

Referring to FIG. 1d, the central axis AXJ0 of the particle jet JET0 may sometimes be displaced with respect to the central axis AX0 of the accelerating nozzle NOZ1. $d_{AXJ0}$ may denote a distance between the axis AX0 and the axis AXJ0, e.g. at the center of the object plane O1 of the measuring device 500. The displacement $d_{AXJ0}$ may be caused e.g. due to one or more asymmetric flows of the spraying gun GUN1. For example, the feeding nozzle NOZ2 may be displaced with respect to the axis AX0 of accelerating nozzle NOZ1. For example, one or more gas flows may be introduced asymmetrically to a plenum chamber CHA1 of the spraying gun GUN1.

The axis AX0 of the accelerating nozzle NOZ1 may be defined to be e.g. an axis of symmetry of the accelerating nozzle NOZ1.

The method may comprise measuring the lateral and/or transverse position of the central axis AXJ0 of the particle jet JET0, e.g. in order to accurately control the deposition rate at different lateral and transverse positions of the target TARG1.

The method may comprise determining a position of a central axis AXJ0 of the particle jet JET0 based on one or more determined distributions (v(x),v(z)). The method may comprise controlling moving the particle jet (JET0) with respect to a target object (TARG1) according to the determined position of the central axis (AXJ0) of the particle jet (JET0).

The axis AXJ0 of the jet JET0 may be defined to be e.g. at a center of gravity of the spatial mass flux distribution of the particle jet JET0.

The accelerating nozzle NOZ1 may have an inner diameter $d_{NOZ1}$ at the outlet.

Figure 1E:
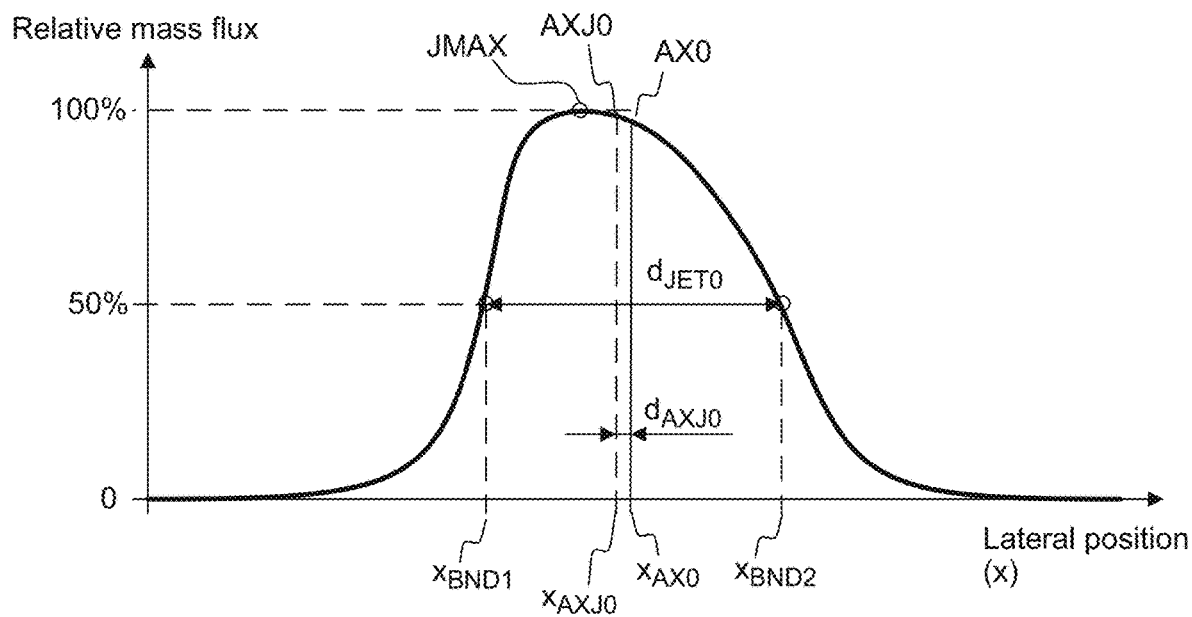
FIG. 1e shows, by way of example, lateral distribution of mass flux of a particle jet.

FIG. 1e shows, by way of example, relative mass flux J(x)/JMAX of the particle jet JET0 as a function of lateral position coordinate x. The unit of mass flux J(x) may be e.g. mass per unit area per unit time (g/m$^2$/s). JMAX may denote the maximum value of the mass flux. Relative mass flux may mean the mass flux divided by the maximum value JMAX. To the first approximation, the mass flux J(x,y,z) at a position (x,y,z) may be proportional to the particle number density n(x,y,z) multiplied by the particle mean velocity v(x,y,z). To the first approximation, the deposition rate for forming the coating COATI at a position (x,z) may be substantially proportional to the mass flux J(x,y,z) at the position (x,y,z). The number density means the number or particles per unit volume.

The symbol $x_{AX0}$ may denote the lateral position of the axis AX0 of the nozzle NOZ1. The symbol $x_{AXJ0}$ may denote the lateral position of the axis AXJ0 of the particle jet JET0.

The symbol $x_{BND1}$ may denote a first lateral position where mass flux is equal to 50% of the maximum value JMAX. $x_{BND2}$ may denote a second lateral position where mass flux is equal to 50% of the maximum value JMAX. $d_{JET0}$ may denote a width of the particle jet JET0 in the lateral direction SX. The width $d_{JET0}$ of the particle jet JET0 may be e.g. equal to the distance $x_{BND2}-x_{BND1}$. The width $d_{JET0}$ of the particle jet JET0 may mean e.g. a (maximum) distance between points where the mass flux distribution reaches 50% of the maximum value JMAX. The width $d_{JET0}$ may mean e.g. the full-width-at-half-maximum width (FWHM width) of the mass flux distribution J(x,y,z).

Figure 2A:
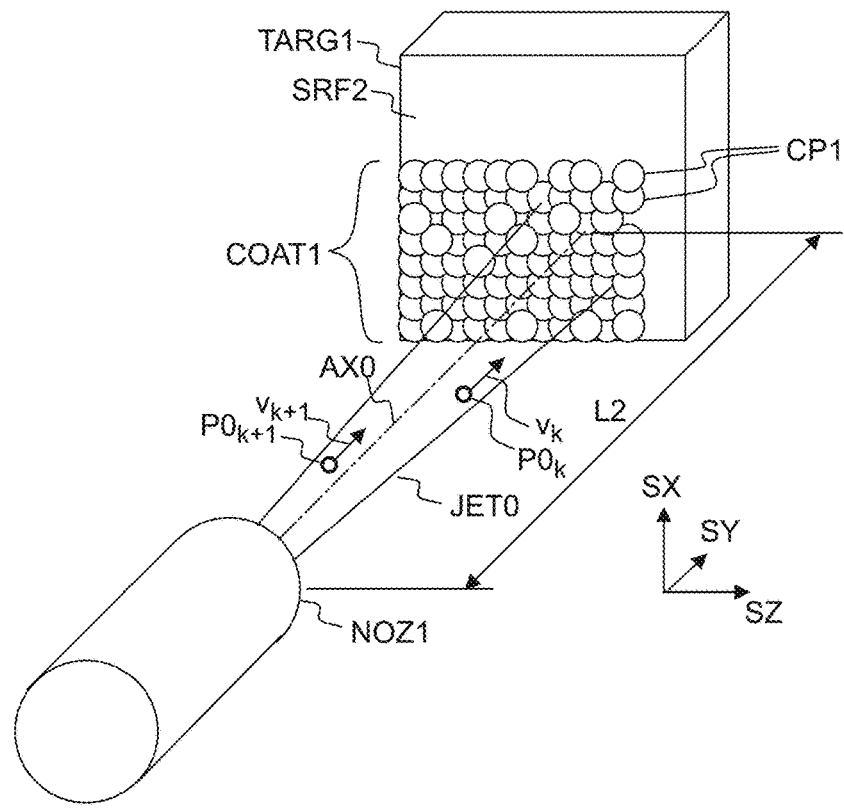
FIG. 2a shows, by way of example, in a three-dimensional view, forming a coating on a target object by cold spraying.

Referring to FIG. 2a, moving particles P0 of the jet JET0 may be deformed when they impact on the target object TARG1. The deformed particles CP1 may form a deposited layer COATI on the surface SRF2 of the target object TARG1. The symbol L2 may denote a distance between the accelerating nozzle NOZ1 and the surface SRF2 of the target object TARG1.

Figure 2B:
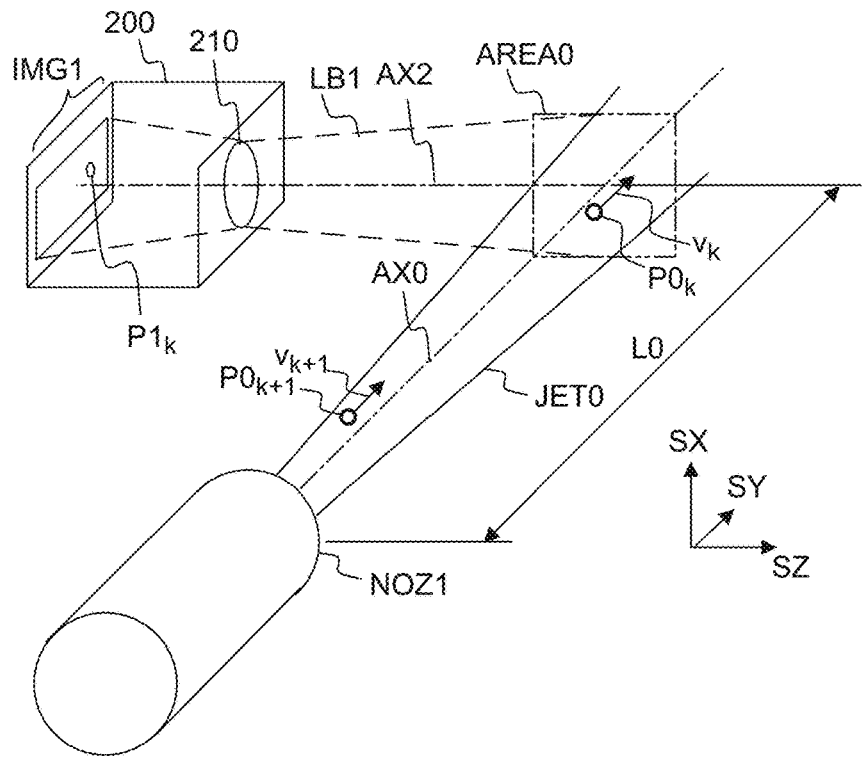
FIG. 2b shows, by way of example, in a three-dimensional view, detecting particles which pass through a reference area.

Referring to FIG. 2b, the nozzle NOZ1 may provide a particle flux through a reference area AREA0. L0 may denote the distance between the accelerating nozzle NOZ1 and the reference area AREA0. The jet may have a diameter ($d_{JET0}$) at the position of the reference area AREA0. The measuring device 500 may be arranged to measure velocity, number density and/or size of particles which pass through the reference area AREA0 during a measurement time period. The measuring device 500 may be arranged to capture images of particles which pass through the reference area AREA0. The measuring device 500 may be arranged to monitor the particle jet in the vicinity of the reference area AREA0.

In an embodiment, the reference area AREA0 may be positioned e.g. such that the distance L0 is substantially equal to the distance L2. For example, the nozzle may be moved away from the target object to a monitoring position, so that the device 500 may monitor detect particles which are moving at the distance L2 from the nozzle.

In case of substantially continuous monitoring of the jet, the distance between the nozzle and the target may be equal to L2 during the monitoring. The measuring device 500 may be arranged to detect particles before they hit the target. The distance L0 may be shorter than the distance L2.

The optical measuring device 500 may be arranged to measure one or more properties of particles P0 passing through the reference area AREA0. The optical measuring device 500 may be arranged to measure one or more velocity values of particles P0 passing through the reference area AREA0. The optical measuring device 500 may be arranged to determine e.g. one or more velocity distributions in the reference area AREA0, e.g. as a function of position coordinate x and/or as a function of position coordinate z. The optical measuring device 500 may be arranged to determine e.g. one or more number density distributions n(x), n(z), n(x,z), n(x,y,x) in the reference area AREA0, e.g. as a function of position coordinate x and/or as a function of position coordinate z.

Figure 2C:
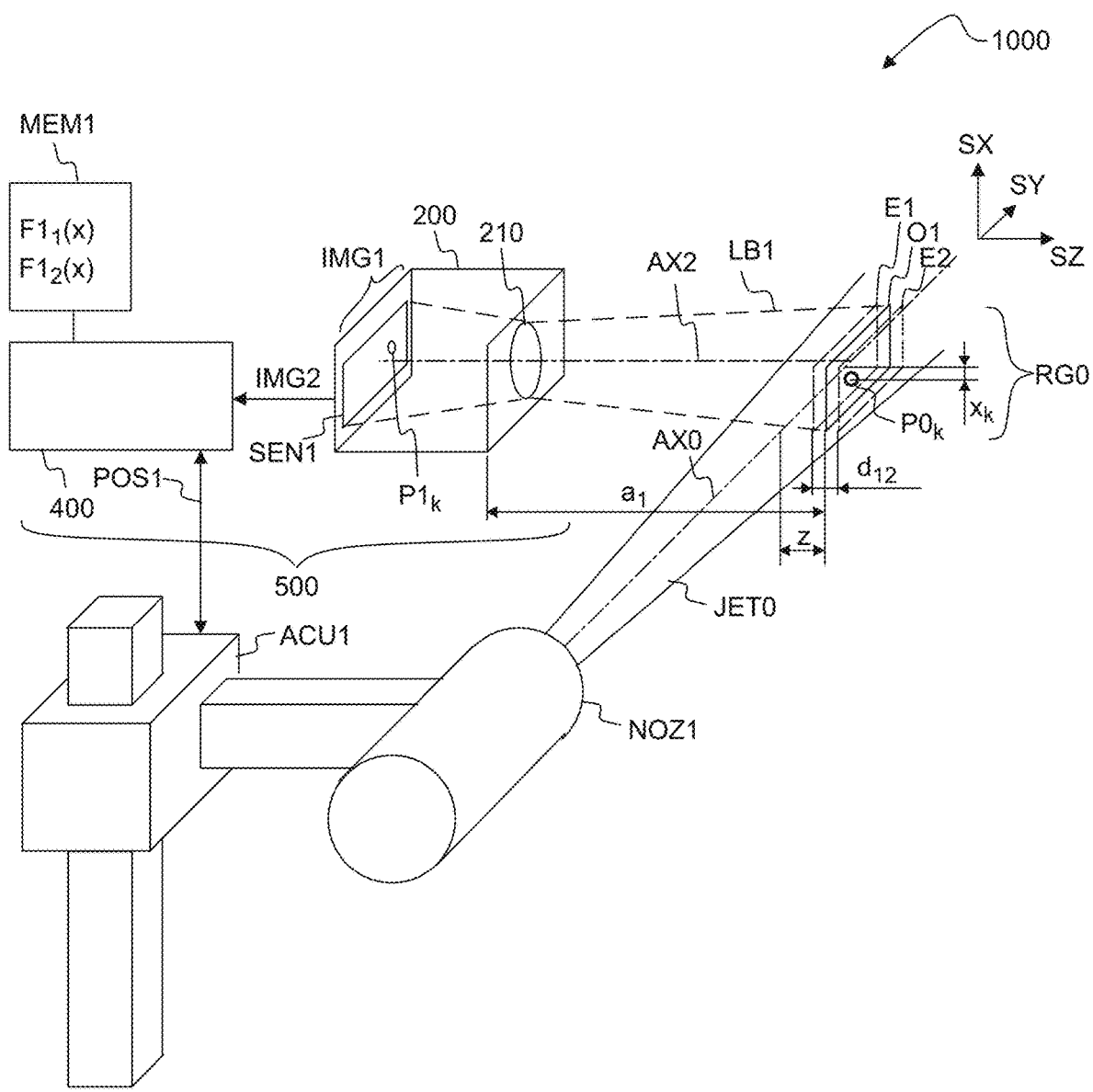
FIG. 2c shows, by way of example, in a three-dimensional view, capturing images of a measuring region of the particle jet.
Figure 2D:
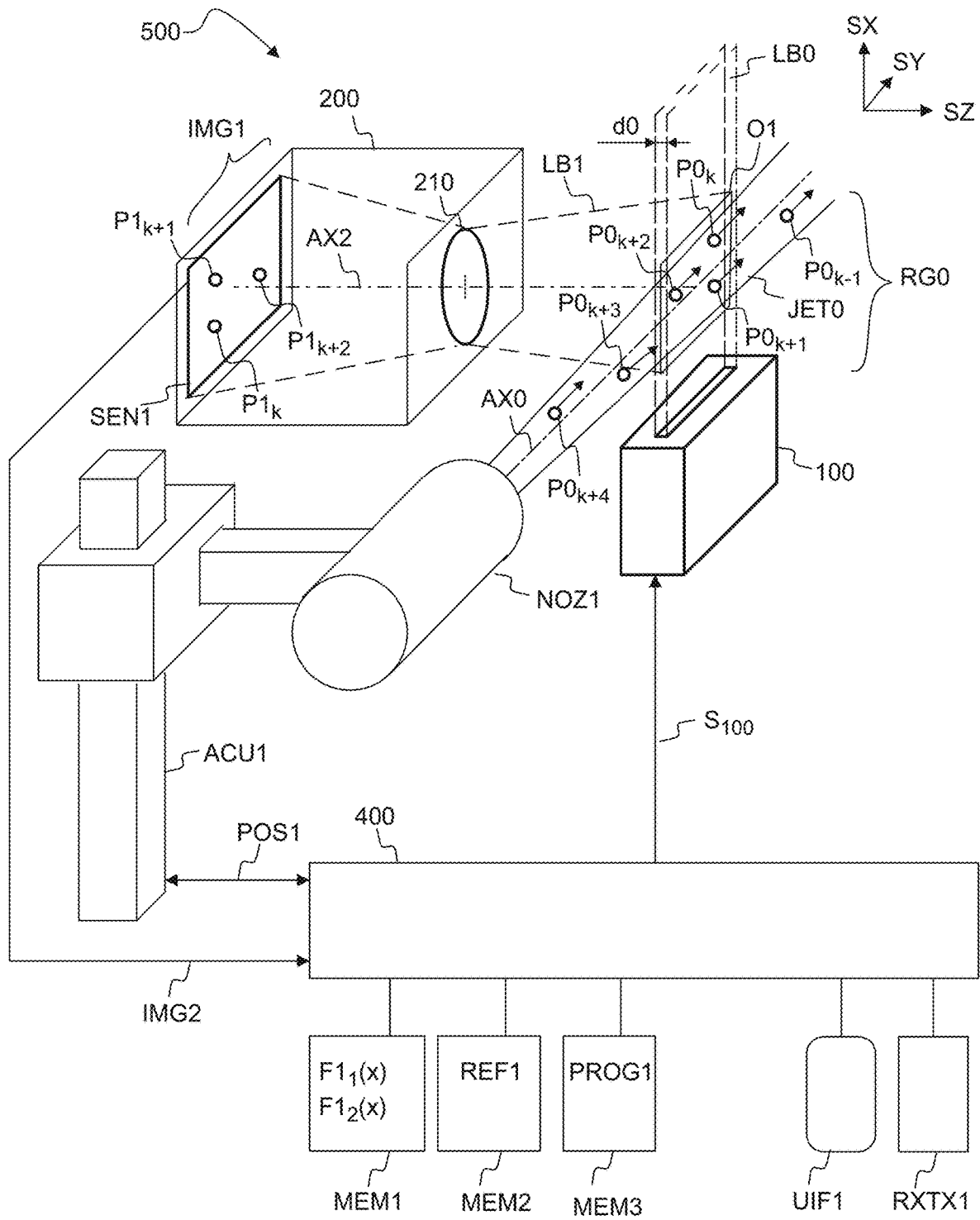
FIG. 2d shows, by way of example, in a three-dimensional view, units of the monitoring apparatus.

Referring to FIGS. 2c and 2d, the measuring device 500 may comprise an imaging unit 200, and a data processing unit 400. The imaging unit 200 may be arranged to capture digital images IMG2 of particles located within a measurement region RG0 of the particle jet JET0. The imaging unit 200 may be arranged to capture a plurality of images at a high frame rate. The imaging unit 200 may be a video camera.

The measuring device 500 may be arranged to measure one or more velocity values by analyzing the captured images. The measuring device 500 may be arranged to measure one or more spatial distributions $F1_1(x)$, $F1_2(x)$ by analyzing the captured images (FIG. 4e). The device 500 may be arranged to detect images of particles in a captured image. The device 500 may be arranged to count images of detectable particles in a captured image. The device 500 may be arranged to determine a velocity of a particle from a displacement between a first sub-image and a second sub-image of the same particle. The device 500 may be arranged to determine a mean velocity value ($v_{AVE}$) from velocities ($v_k$, $v_{k+1}$) of several particles.

For example, the device 500 may be arranged to measure a spatial particle velocity distribution. The measuring device 500 may be arranged to measure a lateral velocity distribution by analyzing the captured images. The velocity distribution ($v_{AVE}(x)$) may be e.g. the particle mean velocity ($v_{AVE}$) as a function of a lateral position (x) with respect to the axis AX0 of the nozzle NOZ1. The lateral position may be specified e.g. by x-coordinate in the direction SX.

The measuring device 500 may be arranged to measure a spatial velocity distribution by analyzing the captured images. A particle P0 may have a large axial velocity component $v_y$ in the direction of the axis AX0 (i.e. in the direction SY). The particle P0 may also have a lateral velocity component vx in the direction SX and/or a transverse velocity component $v_Z$ in the direction SZ. The measuring device 500 may be arranged to measure e.g. the velocity components $v_Y$ and $v_X$ for each particle located in the measurement region RG0. The measuring device 500 may be arranged to measure a spatial velocity distribution for the axial velocity components $v_Y$ as a function of the lateral position x.

Figure 5:
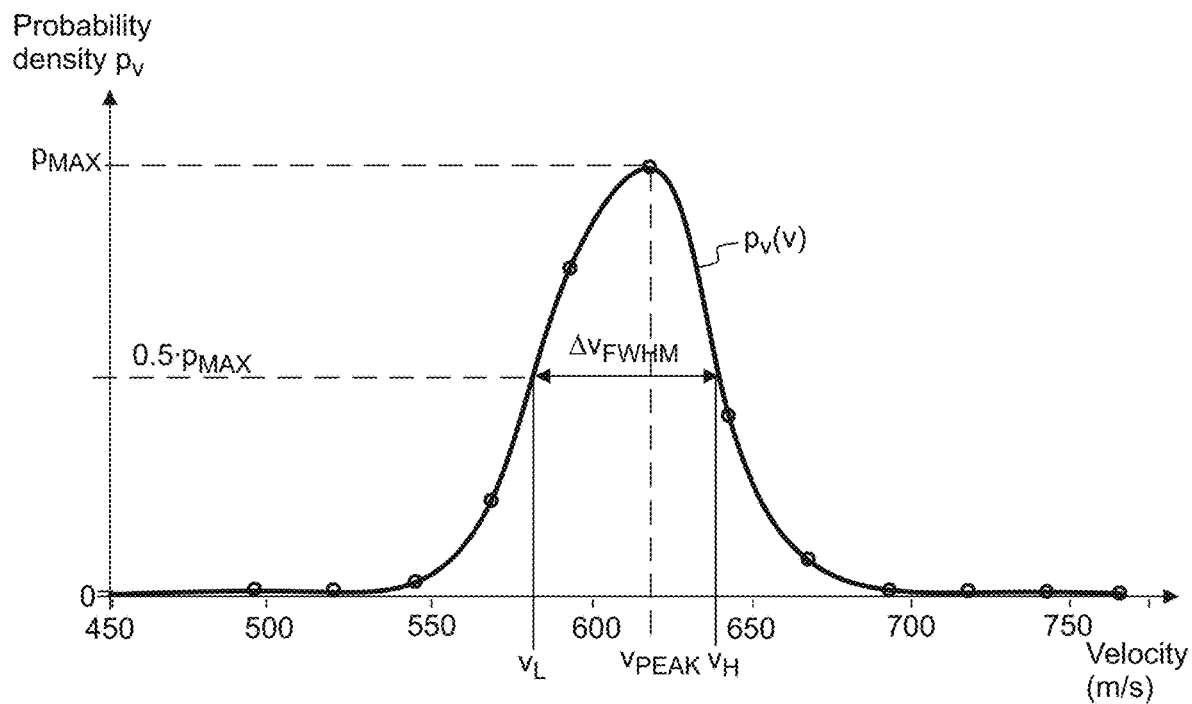
FIG. 5 shows, by way of example, a probability distribution function at a given position of the particle jet.

The measuring device 500 may be arranged to measure a local velocity probability distribution ($p_v(v)$) by analyzing the captured images (FIG. 5).

The measuring device 500 may be arranged to measure a spatial distribution of mass flow by analyzing the captured images. A mass flux value at a position x may be determined e.g. by multiplying measured velocity $v_{AVE}(x)$ with measured particle number density n(x) and with a constant $m_{P0}$. The constant $m_{P0}$ may represent e.g. an average mass of a single particle P0.

The one or more spatial distributions may provide information e.g. about an effective width ($d_{JET0}$) of the particle jet.

The particles P0 may reflect, refract and/or scatter light LB1 towards the illuminating unit 100. The particles P0 may provide reflected light LB1 by reflecting, refracting and/or scattering illuminating light LB0 (FIG. 2d).

The imaging unit 200 may comprise focusing optics 210 and an image sensor SEN1. The focusing optics 210 may be arranged to form an optical image IMG1 on an image sensor SEN1, by focusing the light LB1 received from the particles. The image sensor SEN1 may convert one or more optical images IMG1 into a digital image IMG2. The data processing unit 400 may be configured to analyze one or more digital images IMG2 obtained from the image sensor SEN1. The data processing unit 400 may be configured to perform one or more data processing operations e.g. for determining one or more distributions. The data processing unit 400 may be configured to verify operation of cold spraying apparatus, to control operation of the cold spraying apparatus, and/or to provide an indication if a determined distribution comprises an abnormal region.

The image sensor SEN1 may be e.g. a CMOS sensor or a CCD sensor. CMOS means Complementary Metal Oxide Semiconductor. CCD means Charge Coupled Device. The image sensor SEN1 may comprise a plurality of light detector pixels arranged in a two-dimensional array.

The digital image IMG2 may have a width $\xi_{IMG}$ and a height $\upsilon_{IMG}$ in the image space defined by directions $S\xi$ and $S\upsilon$. The image of the axis AX0 may be e.g. substantially parallel with the direction $S\xi$. The direction $S\upsilon$ may be perpendicular to the direction $S\xi$ (FIG. 4b).

SX, SY and SZ may denote orthogonal directions. The axis AX0 of the nozzle NOZ1 may be parallel with the direction SY. The direction SX may be called as a lateral direction. The direction SZ may be called as a transverse direction. The imaging unit 200 may have an optical axis AX2. The optical axis AX2 of the imaging unit 200 may be e.g. transverse with respect to the axis AX0 of the nozzle NOZ1.

The measuring region RG0 of the measuring device 500 may be a substantially planar volume, which comprises the object plane O1 in the middle of the measuring region RG0. The thickness of the measuring region RG0 may be equal to the depth-of-field $d_{12}$ in a transverse direction SZ. The measuring region RG0 may extend by a distance of 50% of the depth-of-field $d_{12}$ from the object plane O1 in the direction SZ and also in the opposite direction −SZ.

The depth-of-field $d_{12}$ of the imaging unit 200 may be e.g. smaller than or equal to 2 mm, advantageously in the range of 0.1 mm to 1.0 mm.

The depth-of-field $d_{12}$ may be e.g. in the range of 2% to 40% of a width $d_{JET0}$ of the particle jet JET0 at the outlet end of the nozzle NOZ1.

A distance a1 between the object plane O1 and the imaging optics 210 may be in e.g. the range of 5 to 50 times the transverse width $d_{JET0}$ of the particle jet JET0 at the outlet end of the nozzle NOZ1.

The imaging unit 200 may form a substantially sharp image of a particle on the image sensor SEN1 when the particle is within the measuring region RG0. The imaging unit 200 may form a substantially sharp image of a particle on the image sensor SEN1 when the particle is within 50% of the depth-of-field $d_{12}$ from the object plane O1. The imaging unit 200 may form a blurred image of a particle on the image sensor SEN1 when the particle is outside the measurement region RG0 but close to the measurement region RG0. Yet, some particles may be so far away from the measurement region RG0 that the imaging unit 200 does not form a detectable image of those particles.

Each optical image IMG1 formed on the image sensor SEN1 may be an image of the measurement region RG0. The image IMG1 may comprise one or more sub-images P1 of the moving particles P0 of the particle jet JET0. The measurement region RG0 may have a central plane O1, which may be called e.g. as the object plane of the imaging unit 200. The imaging optics 210 may have a limited depth of field $d_{12}$. Consequently, the imaging unit 200 may form a sharp sub-image P1 of a particle P0 on the image sensor SEN1 only when said particle P0 is located on the object plane O1. The sub-image P1 of a particle P0 may be less sharp, i.e. slightly blurred when the distance between said particle P0 and the object plane O1 is greater than zero. The measurement region RG0 may be located between a first boundary E1 and a second boundary E2. The object plane O1 may be located between the boundaries E1, E2. The distance between the boundaries E1, E2 may be equal to the depth of field $d_{12}$ of the imaging unit 200. The measurement region RG0 may have a thickness $d_{12}$ in the transverse direction SZ.

The apparatus 1000 may be arranged to change the transverse position z of the object plane O1, with respect to the axis AX0 of the nozzle NOZ1. The transverse position z of the object plane O1 may be changed e.g. using the actuator ACU1 to move the nozzle NOZ1 with respect to the imaging unit 200. The actuator ACU1 to move the nozzle NOZ1 e.g. in the direction SZ. The actuator ACU1 may comprise e.g. a translation stage, which is moved by one or more stepper motors. The actuator ACU1 may be e.g. an industrial robot.

For continuous monitoring, the imaging unit 200 may also be attached to the nozzle NOZ1 such that the position of the object plane O1 may remain fixed to the nozzle NOZ1 during movements of the nozzle NOZ1.

Each moving particle $P0_k$ of the particle jet JET0 may have an instantaneous lateral position $x_k$ with respect to the axis AX0 of the nozzle NOZ1.

A particle P0 which is outside the measurement region RG0 may have a blurred sub-image on the image sensor SEN1. The device 500 may be arranged to operate such that the blurred sub-images are not used as a basis for determining a velocity of a particle.

The imaging unit 200 may form a substantially sharp image P1 of each particle P0, which is located in the measurement region RG0 during an exposure time $T_{ex}$ of the image sensor SEN1. The imaging unit 200 may form a substantially sharp image P1 of each particle P0, which is located in the measurement region RG0 during triggering of an illuminating light pulse LB0. The optical image IMG1 formed on the active area of the image sensor SEN1 may comprise a plurality of sub-images P1. Each sub-image P1 may be an image of a particle P0. The image sensor SEN1 may convert an optical image IMG1 into a digital (captured) image IMG2.

The image IMG2 captured by the imaging unit 200 may represent a common overlapping portion of the measurement region RG0 and the particle jet JET0. An average number of particles appearing in a single captured image may be e.g. in the range of 2 to 1000. An average number of particles appearing in a single captured image may be e.g. in the range of 10 to 100. The sub-images P1 of the particles P0 may be detected by an image analysis algorithm. The particles P0 may be moving at a high velocity during capturing of an image IMG2. The velocity of each particle appearing in a captured image may be determined from a displacement value Δu and from the timing of the exposure and/or illumination. The optical image P1 of each particle P0 may move during capturing of the image IMG2. The movement of the optical image may define a displacement value Δu, which may be determined from the captured image IMG2 by image analysis. Each substantially sharp image P1 of a particle P0 may be associated with a displacement value Δu. The velocity $v_k$ of a particle $P0_k$ may be determined from the displacement value $\Delta u_k$ and from the duration ($T_F$) of illumination and/or from the exposure time period $T_{ex}$.

The measuring device 500 may comprise a data processor 400 to determine one or more velocity values by analyzing captured digital images IMG2. The determined velocity values may be stored e.g. in a memory MEM1. The measuring device 500 may comprise a data processor 400 to form one or more lateral distributions $F1_1(x)$, $F1_2(x)$ by analyzing captured digital images IMG2. The lateral distributions $F1_1(x)$, $F1_2(x)$ may be stored e.g. in a memory MEM1.

The measuring device 500 may capture a first image $IMG2_{z1}$ of the particle jet JET0 when the object plane O1 is at a first transverse position z1 with respect to the axis AX0 (e.g. $d_1$=z1). The measuring device 500 may capture a second image $IMG2_{z2}$ of the particle jet JET0 when the object plane O1 is at a second different transverse position z2 with respect to the axis AX0 (e.g. $d_1$=z2). The measuring device 500 may determine a first lateral distribution $F1_1(x)$ by analyzing the first captured image. The measuring device 500 may determine a second lateral distribution $F1_2(x)$ by analyzing the second captured image IMG2. The measuring device 500 may be arranged to determine one or more transverse distributions from the lateral distributions.

During continuous monitoring, the object plane O1 may remain at a fixed position with respect to the nozzle. For example, the object plane O1 may substantially coincide with the axis AX0 of the nozzle. For example, the object plane O1 may be set to a position (e.g. z=z1) where the lateral velocity distribution is sensitive to an abnormal operating condition of the spraying apparatus.

Referring to FIG. 2d, the monitoring device 500 may comprise an illuminating unit 100 to provide illuminating light LB0. The illuminating unit 100 may provide a sheet of illuminating light LB0. The illuminating unit 100 may be arranged to provide a sheet of illuminating light LB0 to illuminate the measuring region RG0. The sheet of illuminating light LB0 may overlap the measuring region RG0. The sheet of illuminating light LB0 may comprise the object plane O1. The sheet of illuminating light LB0 may be substantially parallel with the object plane O1. The illuminating unit 100 may comprise e.g. one or more laser emitters to provide illuminating light LB0. The illuminating unit 100 may comprise e.g. one or more light emitting diodes (LED) to provide illuminating light LB0.

The position of the illuminating unit 100 may be e.g. mechanically coupled to the position of the imaging unit 200 so as to ensure that the illuminating light LB0 may overlap the measuring region RG0 and/or in order to ensure that the illuminating light LB0 may be substantially parallel with the object plane O1. The illuminating unit 100 may be attached to the imaging unit 200.

The illuminating unit 100 may be arranged to provide a sheet of illuminating light pulses LB0. The sheet may have a thickness d0. The thickness d0 of the illuminating sheet may be e.g. smaller than the depth-of-field $d_{12}$ ($d0>d_{12}$), substantially equal to the depth-of-field $d_{12}$ ($d0=d_{12}$), or greater than the depth-of-field $d_{12}$ ($d0>d_{12}$). Using a thickness d0 smaller than or equal to the depth-of-field $d_{12}$ may facilitate analysis of the captured images by eliminating blurred sub-images from the captured images.

The illuminating light beam LB0 may have e.g. a thickness d0 in the direction of the optical axis AX2. The illuminating unit 100 may be arranged to provide e.g. a substantially planar light beam. Illuminating the jet by the light sheet may allow defining the thickness d0 and/or position of the measurement region RG0 accurately.

The illuminating unit 100 may be arranged to modulate the illuminating light beam LB0. The illuminating unit 100 may be arranged to modulate the optical intensity of the illuminating light beam LB0 according to control signal $S_{100}$. The measuring device 500 may be arranged to provide a control signal $S_{100}$ for modulating the illuminating light beam LB0. The control signal $S_{100}$ may comprise e.g. timing pulses for controlling timing of operation of the illuminating unit 100. The illuminating unit 100 may be arranged to provide one or more illuminating light pulses LB0.

The image sensor SEN1 may convert one or more optical images IMG1 into a digital image IMG2. The data processing unit 400 may be configured to analyze one or more digital images IMG2 obtained from the image sensor SEN1. The data processing unit 400 may comprise one or more data processors. The data processing unit 400 may be configured to perform one or more data processing operations e.g. for determining one or more velocity values, for determining a distribution, for comparing a determined distribution with reference data, and/or for performing a control operation based on a result of the comparison. The data processing unit 400 may be configured to verify operation of cold spraying apparatus, to control operation of the cold spraying apparatus, and/or to provide an indication if a determined distribution comprises an abnormal region.

The device 500 may comprise a memory MEM1 for storing one or more distributions $F1_1(x)$, $F1_2(x)$. For example, a first lateral distribution $F1_1(x)$ may be determined e.g. from images IMG2 captured when the object plane O1 is at a first position $z=z_1$, and a second lateral distribution $F1_2(x)$ may be determined e.g. from images IMG2 captured when the object plane O1 is at a second different position $z=z_2$. For example, an abnormal condition may be detected by comparing a determined distribution $F1_1(x)$ with a reference distribution REF1 (see e.g. FIG. 7). The device 500 may comprise a memory MEM2 for storing one or more reference distributions REF1.

The device 500 may comprise a user interface UIF1 for receiving user input from a user and/or for providing information to a user. The user interface UIF1 may comprise e.g. a keypad or a touch screen for receiving user input. The user interface UIF1 may comprise e.g. a display for displaying visual information. The user interface UIF1 may comprise e.g. a display for displaying one or more measured values determined by analyzing the images. The user interface UIF1 may comprise e.g. a display for displaying one or more determined distributions. The user interface UIF1 may comprise e.g. a display for displaying an indication when one or more values measured by the device are outside an acceptable range. The user interface UIF1 may comprise e.g. an audio output device for providing an indication if one or more velocity values measured by the device are outside an acceptable range. The user interface UIF1 may be configured to provide a visual alarm and/or an alarm sound if one or more velocity values measured by the device are outside an acceptable range.

The device 500 may comprise a communication unit RXTX1 for receiving and/or transmitting data. The device 500 may be arranged to communicate e.g. with a control unit CNT2 of a cold spraying apparatus 1000 via the communication unit RXTX1. The device 500 may receive e.g. position information POS1 via the communication unit RXTX1. The position information POS1 indicate e.g. the position of the nozzle NOZ1. The device 500 may send process control data via the communication unit RXTX1. The process control data may comprise e.g. data for adjusting one or more process parameters PAR1 of the cold spraying apparatus 1000. The device 500 may send one or more measured values via the communication unit RXTX1. The device 500 may send one or more measured values e.g. to an Internet server.

The device 500 may comprise a memory MEM3 for storing computer program code PROG1.

The code PROG1 may, when executed by one or more data processors, cause a system or the device 500 to determine one or more velocity values by analyzing captured images, to compare one or more velocity values with reference data, and to control operation of the spraying apparatus based on the result of the comparison.

The code PROG1 may, when executed by one or more data processors, cause a system or the device 500 to determine to determine one or more distributions $F1_1(x)$ by analyzing captured images, to compare one or more distributions $F1_1(x)$ with reference data REF1, and to control operation of the spraying apparatus based on the result of the comparison.

One or more determined values may be provided to a user and/or to a system. For example, one or more determined distributions may be displayed on a display of a user interface UI F1.

For example, one or more determined distributions may be associated with an identifier and stored in a database. The determined data may be stored e.g. in a protected data archive. The stored data may be subsequently retrieved from the database (archive) based on the identifier. The target object may be e.g. a part of an airplane, wherein it may be useful to have a possibility to study the archived manufacturing data at a later stage. The database may be subsequently accessed e.g. via an internet server.

Figure 3A:
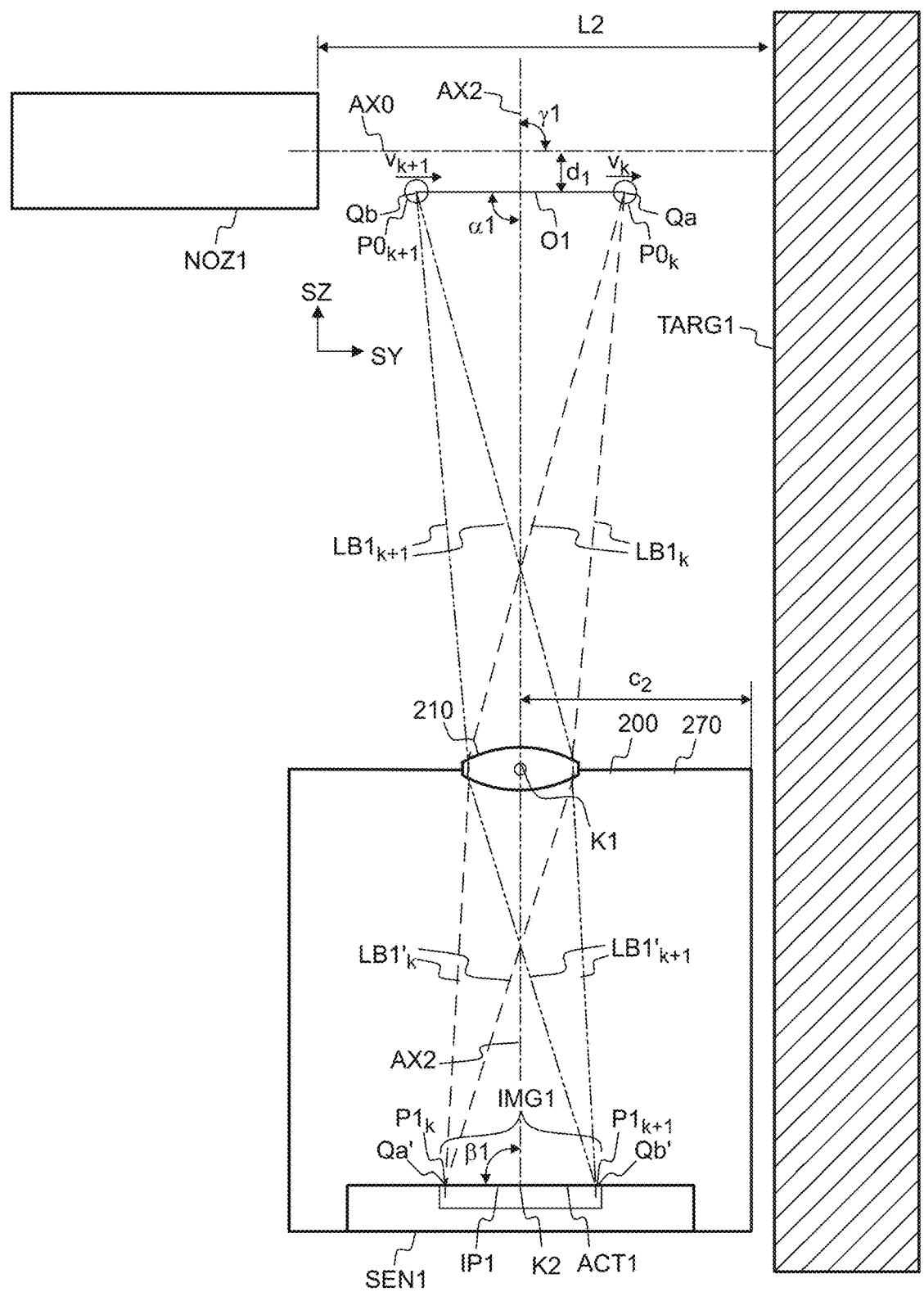
FIG. 3a shows, by way of example, in a side view, monitoring the particle jet by using a perpendicular orientation of the image sensor.
Figure 3B:
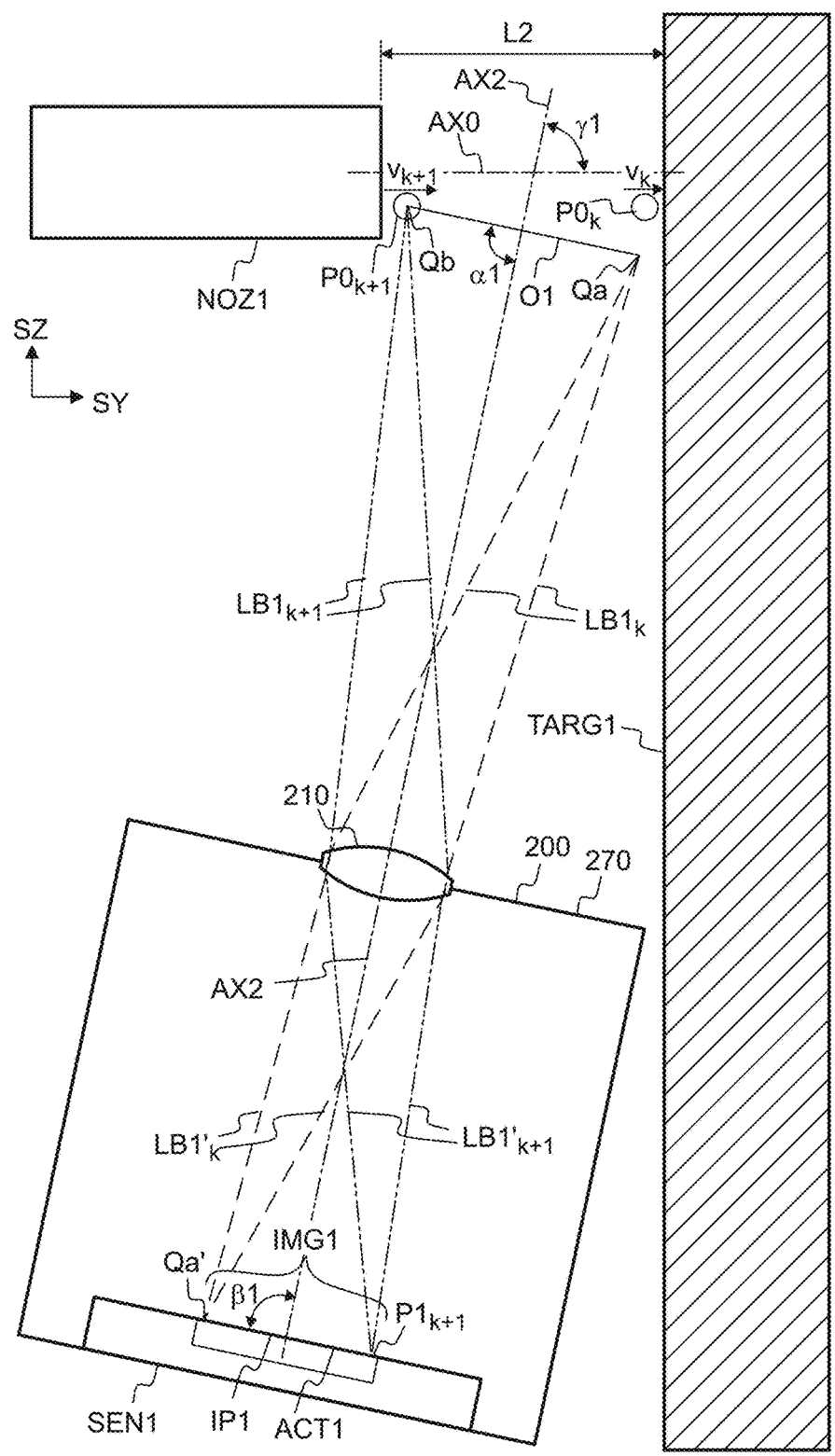
FIG. 3b shows, by way of example, in a side view, monitoring the particle jet by using an inclined orientation of the imaging unit.
Figure 3C:
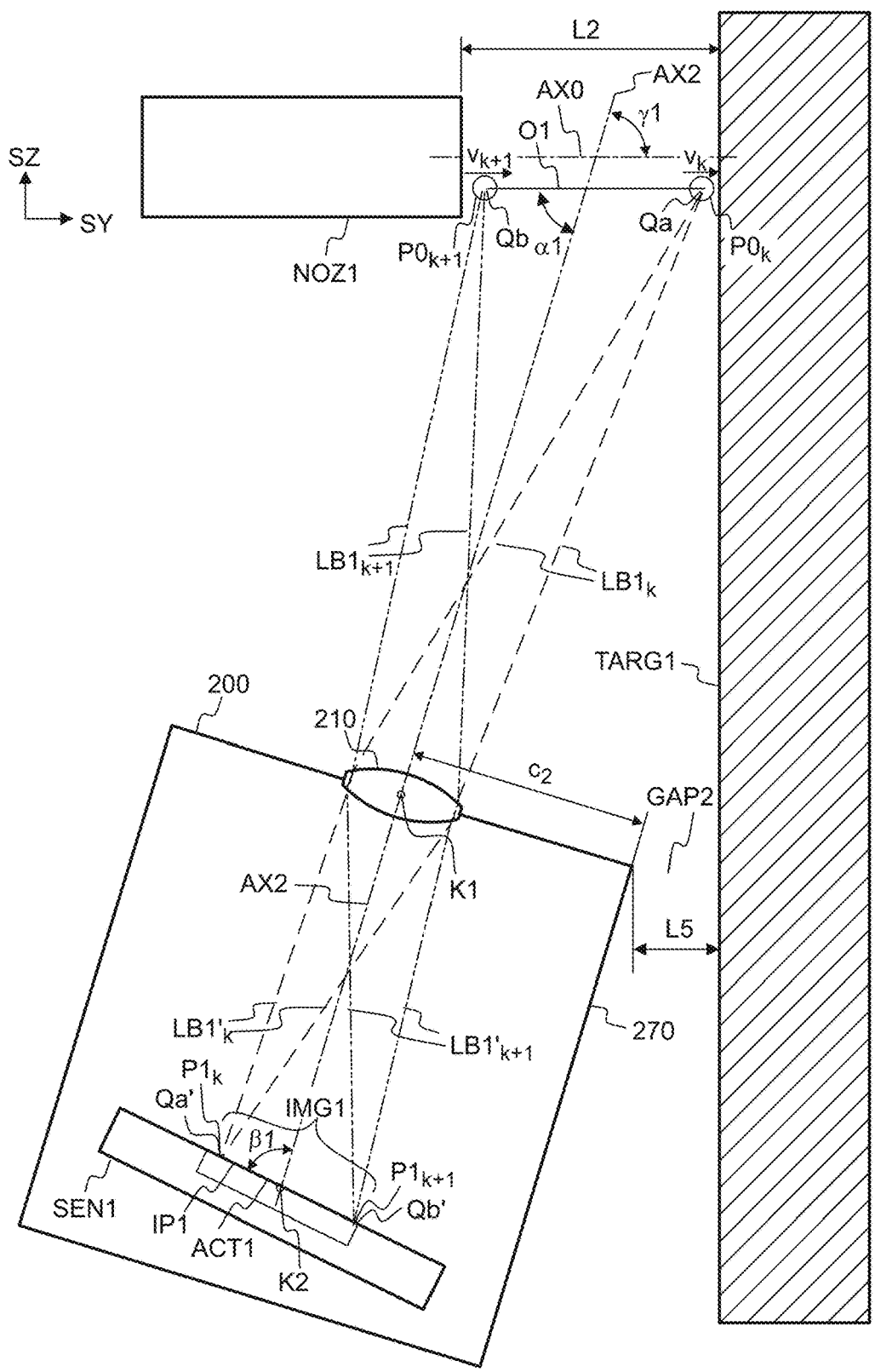
FIG. 3c shows, by way of example, in a side view, monitoring the particle jet by using an inclined orientation of the image sensor.

FIGS. 3a to 3c illustrate an effect of angular orientation $\beta_1$ of image sensor on the angular orientation al of the object plane O1 of the imaging unit 200.

FIG. 3a shows a set-up where the angle γ1 between the optical axis AX2 of the imaging unit 200 and the central axis of the accelerating nozzle NOZ1 is equal to 90°, and the angle β1 between the active area ACT1 of the image sensor SEN1 and the optical axis AX2 is equal to 90°. In other words, FIG. 3a shows a situation where the optical axis AX2 of the imaging unit 200 is perpendicular to the axis AX0 of the accelerating nozzle NOZ1, and wherein the image sensor SEN1 is perpendicular to the optical axis AX2. The set-up of FIG. 3a may be used e.g. when the distance L2 between the nozzle NOZ1 and the target TARG1 is so large that the imaging unit 200 may capture images of the particle jet JET0 by using the perpendicular orientation of the imaging unit 200. The image sensor SEN1 may be perpendicular to the optical axis AX2 also when the nozzle NOZ1 is specifically moved away from the target TARG1 so as to enable monitoring.

The particle jet JET0 may comprise a plurality of particles, e.g. $P0_k$, $P0_{k+1}$. Some particles may be located in the object plane O1, and some particles may be located outside the object plane O1. The imaging unit 200 may form a sharp image of a particle on the image sensor SEN1 only when the particle is in the object plane O1. The imaging unit 200 may form a slightly blurred image of a particle on the image sensor SEN1 when the particle is out of the object plane O1 but inside the measuring region RG0.

The imaging unit 200 may form a sharp image of the object plane O1 on the image sensor SEN1. The velocity vectors $v_k$, $v_{k+1}$ of the moving particles $P0_k$, $P0_{k+1}$ may be substantially parallel with the object plane O1 of FIG. 3a, due to the perpendicular orientation of the optical axis AX2. The optical image IMG1 formed on the image sensor SEN1 may comprise sharp images $P1_k$, $P1_{k+1}$ of particles, which move in the object plane O1. The image sensor SEN1 may provide a captured image IMG2 by converting an optical image IMG1 into a digital image IMG2.

The imaging optics 210 may gather light $LB1_k$ from the particle $P0_k$. The imaging optics 210 may form a focused beam $LB1'_k$ by focusing the gathered light $LB1_k$. The focused beam $LB1'_k$ may impinge on the image sensor SEN1 so as to form a sharp image $P1'_k$ of the particle $P0_k$ on the image sensor SEN1. The imaging optics 210 may form a sharp image $P1_k$ of the particle $P0_k$ on the active area ACT1 of the image sensor SEN1. The active area may mean the active light-detecting surface of the image sensor.

The imaging optics 210 may form a sharp image of the object plane O1. The imaging optics 210 may form a sharp image of the object plane O1 on the image plane IP1. The object plane O1 may have e.g. a first object point Qa and a second object point Qb. The imaging optics 210 may form a sharp image point Qa' of a first object point Qa. The imaging optics 210 may form a sharp image point Qb' of a second object point Qb.

The symbol γ1 denotes an angle between the optical axis AX2 of the imaging unit 200 and the central axis AX0 of the accelerating nozzle NOZ1. α1 denotes an angle between the optical axis AX2 of the imaging unit 200 and the object plane O1 of the imaging unit 200.

The sensor plane (ACT1) of the image sensor may be a planar surface defined by the light detecting pixels of the image sensor. The sensor plane may also be called e.g. as the active light detecting surface, or as the active area. β1 denotes an angle between the optical axis AX2 of the imaging unit 200 and the sensor plane (ACT1) of the image sensor SEN1.

The symbol $c_2$ may denote a distance between the center K1 of the imaging optics 210 and an outer surface of the housing 270 of the imaging unit 200. The distance $c_2$ may be measured in the direction of the axis AX0 of the nozzle NOZ1. The set-up of FIG. 3a could be used e.g. when the distance L2 between the nozzle NOZ1 and the target TARG1 is greater than the distance $c_2$.

Referring to FIG. 3b, the imaging unit 200 may be tilted in order to monitor the particle jet JET0 in a situation where the distance L2 between the accelerating nozzle NOZ1 and the target object TARG1 is small. FIG. 3b shows a comparative set-up where the optical axis AX2 is inclined with respect to the axis AX0 of the accelerating nozzle NOZ1, wherein the image sensor SEN1 is perpendicular to the optical axis AX2, and wherein the object plane O1 is perpendicular to the optical axis AX2. The object plane O1 of the imaging unit 200 of FIG. 3b is inclined with respect to the velocity vectors $v_k$, $v_{k+1}$ of the moving particles $P0_k$, $P0_{k+1}$. Consequently, the particles may rapidly move through the object plane O1 so that the images of the particles remain sharp only during a very short period of time. Each particle which is momentarily located in the object plane may rapidly move out of the object plane. The short time period may make it difficult to reliably detect the particles by analyzing the captured images and/or to accurately measure the velocities of the particles analyzing the captured images.

Referring to FIG. 3c, the imaging unit 200 may be tilted e.g. in order to monitor a short particle jet JET0, i.e. when the distance L2 is small. The imaging unit 200 may be tilted e.g. in order to monitor a measuring region RG0 which is close to the target TARG1. The imaging unit 200 may be tilted e.g. in order to provide a protective gap GAP2 between the imaging unit 200 and the target TARG1.

The image sensor SEN1 may be inclined with respect to the optical axis AX2, so as to facilitate monitoring of the jet JET0 when the imaging unit 200 has the tilted orientation. The image sensor SEN1 may have an inclined orientation to provide an object plane O1, which is substantially parallel e.g. with the direction of movement ($v_k$, $v_{k+1}$) of the particles P0 of the jet JET0, in a situation where the optical axis AX2 of the imaging unit 200 is inclined with respect to the central axis AX0 of the accelerating nozzle NOZ1. The image sensor SEN1 may have an inclined orientation to provide an object plane O1, which is substantially parallel with the central axis AX0 of the nozzle NOZ1.

The velocity vectors $v_k$, $v_{k+1}$ of the moving particles $P0_k$, $P0_{k+1}$ may be substantially parallel with the object plane O1. An average direction of velocity vectors $v_k$, $v_{k+1}$ of particles moving via the measuring region RG0 may be substantially parallel with the object plane O1. Consequently, the images of the moving particles may remain sharp during a longer time period. The longer time period may facilitate reliable detection of the particles, by analyzing the captured images. The longer time period may facilitate accurate measurement of the velocities of the particles, by analyzing the captured images.

One or more properties of the particle jet may be determined by analyzing one or more substantially sharp images of the particles, as captured by the image sensor SEN1.

The inclined orientation of the image sensor may allow monitoring the particle jet close to the target. The inclined orientation of the image sensor may allow substantially continuously monitoring the particle jet close to the target. The inclined orientation of the image sensor may allow monitoring the particle jet in a situation where a sufficient protective gap GAP2 remains between the imaging unit and the target. The inclined orientation of the image sensor may allow monitoring the particle jet when the distance L2 between the nozzle and the target is small. For example, the distance L2 between the accelerating nozzle NOZ1 and the target object TARG1 may be substantially shorter than the distance $c_2$ between the center K1 of the imaging optics 210 and the housing 270 of the imaging unit 200.

The imaging optics 210 may gather light $LB1_k$ from the particle $P0_k$. The imaging optics 210 may form a focused beam $LB1'_k$ by focusing the gathered light $LB1_k$. The focused beam $LB1'_k$ may impinge on the image sensor SEN1 so as to form a sharp image $P1_k$ of the particle $P0_k$ on the image sensor SEN1. The imaging optics 210 may form a sharp image $P1_k$ of the particle $P0_k$ on the active area ACT1 of the image sensor SEN1.

The imaging optics 210 may gather light $LB1_{k+1}$ from the particle $P0_{k+1}$. The imaging optics 210 may form a focused beam $LB1'_{k+1}$ by focusing the gathered light $LB1_{k+1}$. The focused beam $LB1'_{k+1}$ may impinge on the image sensor SEN1 so as to form a sharp image $P1_{k+1}$ of the particle $P0_{k+1}$ on the image sensor SEN1. The imaging optics 210 may form a sharp image $P1_{k+1}$ of the particle $P0_{k+1}$ on the active area ACT1 of the image sensor SEN1.

The image sensor SEN1 may be inclined such that the waist of the focused beam $LB1'_k$ may coincide with the surface of the image sensor SEN1 and such that the waist of the focused beam $LB1'_{k+1}$ may coincide with the surface of the image sensor SEN1. In other words, the image sensor SEN1 may be inclined such that the waist of the focused beam $LB1'_k$ and the waist of the focused beam $LB1'_{k+1}$ may coincide with the sensor plane ACT1 of the image sensor SEN1.

The object plane O1 may have e.g. a first object point Qa and a second object point Qb. The imaging optics 210 may form a sharp image point Qa' of a first object point Qa. The imaging optics 210 may form a sharp image point Qb' of a second object point Qb. The imaging optics 210 may form a sharp image of the object plane O1 on an image plane IP1. The image plane IP1 may comprise the image points Qa', Qb'. The inclined orientation of the image sensor SEN1 may be selected such that the object plane O1 may be substantially parallel with the velocity vectors ($v_k$, $v_{k+1}$) of the particles of the particle jet JET0. The inclined orientation of the image sensor SEN1 may be selected such that the sensor plane ACT1 of the image sensor SEN1 may coincide with the image plane IP1. The focused beam $LB1'_k$ may have a waist at the point Qa'. The focused beam $LB1'_{k+1}$ may have a waist at the point Qb'. The waist of the beam means the narrowest region of the beam. The imaging optics 210 may form a sharp image point Qa' of a first object point Qa on the active area of the sensor SEN1. The imaging optics 210 may form a sharp image point Qb' of a second object point Qb on the active area of the sensor SEN1.

The angle γ1 between the central axis AX0 of the nozzle NOZ1 and the optical axis AX2 of the imaging unit 200 may be e.g. in the range of 45° to 85°, advantageously in the range of 70° to 80°.

The symbol α1 may denote an angle between the object plane O1 and the optical axis AX2 of the imaging unit 200. The object plane O1 may be inclined with respect to the optical axis AX2. The angle α1 between the object plane O1 and the optical axis AX2 of the imaging unit 200 may be e.g. in the range of 45° to 85°, advantageously in the range of 70° to 80°.

The angle β1 between the sensor plane (ACT1) of the image sensor SEN1 and the optical axis AX2 of the imaging unit 200 may be e.g. in the range of 65° to 89°, advantageously in the range of 75° to 85°. An angle (90°−β1) between the surface normal of the image sensor SEN1 and the optical axis AX2 of the imaging unit 200 may be e.g. in the range of 1° to 25°, advantageously in the range of 5° to 15°, respectively.

The optical axis AX2 of the imaging unit 200 may be defined by a center point K1 of the imaging optics 210 and by a center point K2 of the active area of the image sensor SEN1. The optical axis AX2 may be a line that defines a path along which light propagates through the K1 of the optics 210 to the center K2 of the active light-detecting area ACT1 of the image sensor SEN1.

The imaging unit 200 may comprise a housing 270. The size of the housing 270 of the imaging unit 200 may be substantially larger than the size of the active area ACT1 of the image sensor SEN1. The width of the imaging unit 200 may be substantially greater than the width of the active area ACT1 of the image sensor SEN1.

Figure 3D:
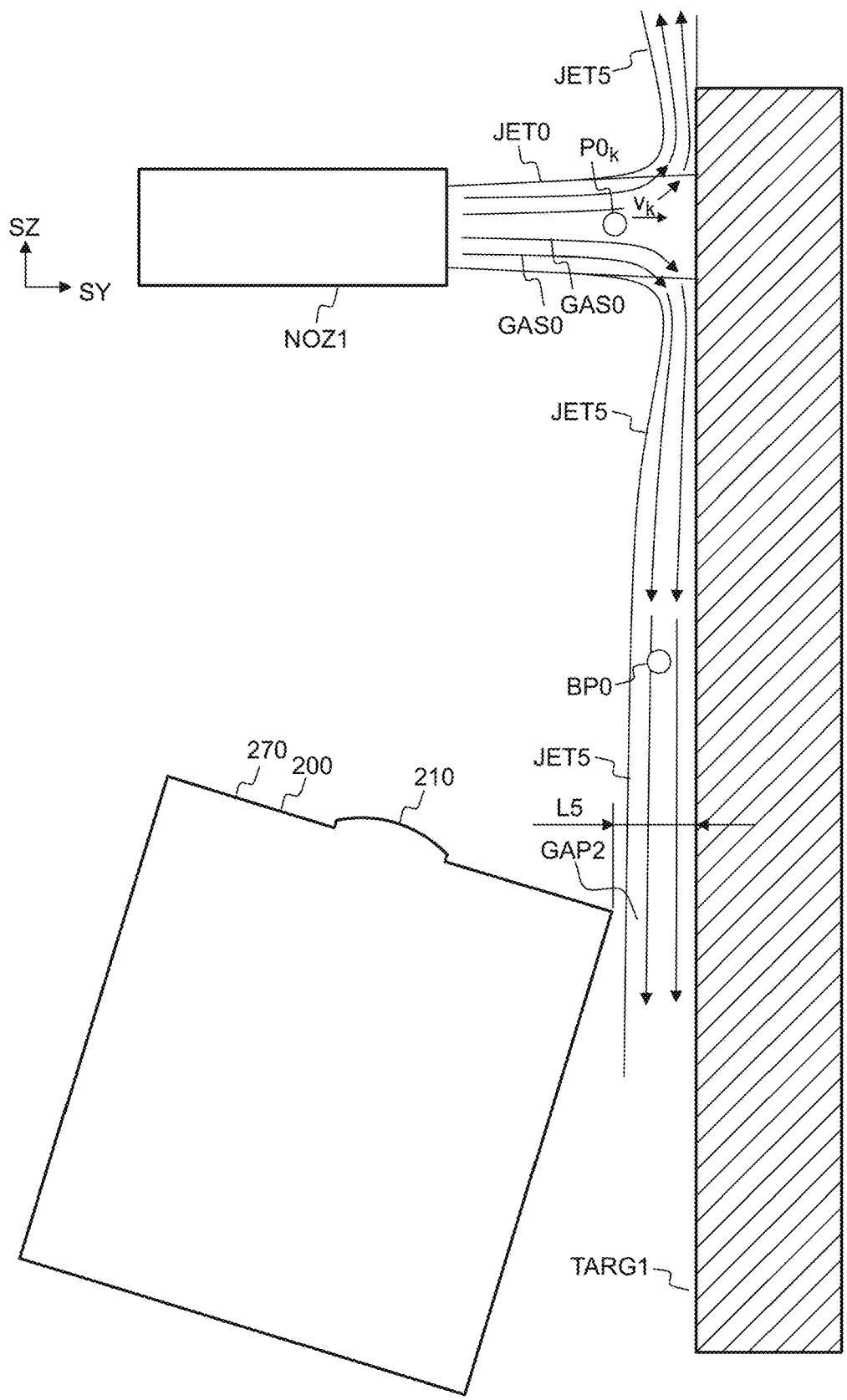
FIG. 3d shows, by way of example, in a side view, a gap between the imaging unit and the target.

Referring to FIG. 3d, the accelerating nozzle NOZ1 may provide a gas jet in addition to the particle jet JET0. The gas jet may comprise or consist of the accelerating gas GAS0. The gas jet may impinge on the target TARG1. The impinging gas jet may form a wall jet JET5, which may spread along the surface of the target TARG1, away from the axis AX0. The wall jet JET5 may comprise accelerating gas GAS0 ejected from the nozzle NOZ1. The wall jet JET5 may also comprise entrained ambient gas, e.g. ambient air, recirculating accelerating gas GAS0 and/or protective gas. The wall jet JET5 may also comprise bounced coating particles (BP0) which have not adhered to the target TARG1. The gas and the particles BP0 of the wall jet JET5 may propagate along the surface of the target TARG1, radially away from the axis AX0. The wall jet JET5 may cause heating and/or contamination of the imaging unit 200. The particles could disturb operation of the imaging unit 200 e.g. by sticking to the optics 210. The gap GAP2 between the imaging unit 200 and the target TARG1 may provide a pathway for the wall jet JET5 so as to reduce or avoid the heating and/or contaminating effect of the wall jet JET5 on the imaging unit 200. L5 may denote a minimum distance between the imaging unit 200 and the target TARG1. The protective gap GAP2 may have a width L5 in the direction of the axis AX0. The width L5 of the protective gap GAP2 may be e.g. greater than 5 mm, advantageously greater than or equal to 15 mm. The protective gap GAP2 may also be useful e.g. when coating convex or concave surface portions of a target object TARG1 (see also FIG. 9b).

Figure 3E:
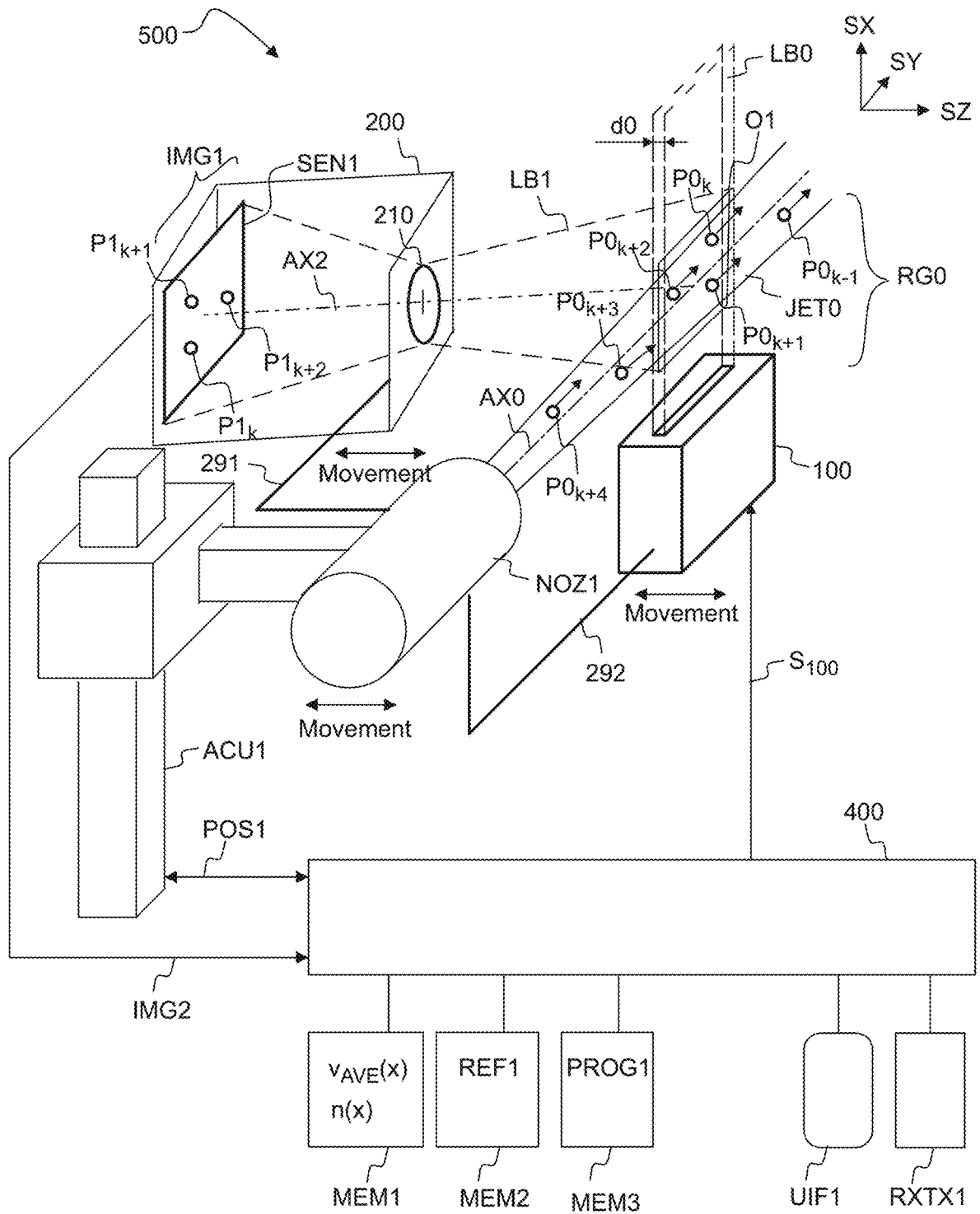
FIG. 3e shows, by way of example, in a three-dimensional view, a monitoring apparatus, wherein the imaging unit is attached to the spraying gun.

Referring to FIG. 3e, the monitoring device 500 may be arranged to operate such that the particle jet may be monitored substantially continuously during forming the coating COATI on the target TARG1.

An actuator ACU1 may be arranged to move a combination of the accelerating nozzle NOZ1 and the imaging unit 200 with respect to a target object TARG1. The actuator ACU1 may move the combination of the accelerating nozzle NOZ1 and the imaging unit 200 such that a distance (d1) between the object plane O1 and the axis AX0 of the nozzle NOZ1 may remain substantially constant during said moving. The imaging unit 200 and the illuminating unit 100 may be attached to the moving nozzle NOZ1, so as to ensure that the nozzle NOZ1 and the object plane O1 may move the same distance in the same direction (e.g. in the direction SZ).

The illuminating unit 100 may be e.g. mechanically connected to the imaging unit 200 by one or more supporting structures 291, 292 so as to ensure that the position of the illuminating light sheet LB0 coincides with the object plane O1. The imaging unit 200 and the illuminating unit 100 may be attached to the moving spraying gun GUN1 by one or more mechanical supporting structures 291, 292. The nozzle, the imaging unit 200, and the illuminating unit 100 may be attached to a moving part of the actuator ACU1. The structures 291, 292 may fix the positions of the imaging unit 200 and the illuminating unit 100 with respect to the nozzle NOZ1. The rigid mechanical connection between the units 100, 200 and the NOZ1 may ensure in a simple and reliable manner that the object plane O1 and the illuminating sheet LB0 may remain in the same relative position with respect to the nozzle NOZ1, in a situation where the nozzle NOZ1 is moved with respect to the target object TARG1 e.g. by using the actuator ACU1. The actuator ACU1 may be arranged to move the imaging unit 200, and the illuminating unit 100 together with the nozzle NOZ1. The actuator ACU1 may be arranged to move the combination of the accelerating nozzle NOZ1, the imaging unit 200, and the illuminating unit 100 with respect to the target object TARG1.

The imaging unit 200 may comprise the inclined image sensor SEN1, e.g. in order to facilitate monitoring of the particle jet JET0 close to the target TARG1. The imaging unit 200 may comprise an inclined image sensor SEN1, to facilitate substantially continuous monitoring of the particle jet JET0 during a coating operation.

The monitoring device 500 may be arranged to provide one or more velocity values by analyzing the captured images. The monitoring device 500 may be arranged to provide e.g. a velocity distribution $v_{AVE}(x)$ and/or a particle number density distribution $n(x)$.

Figure 4A:
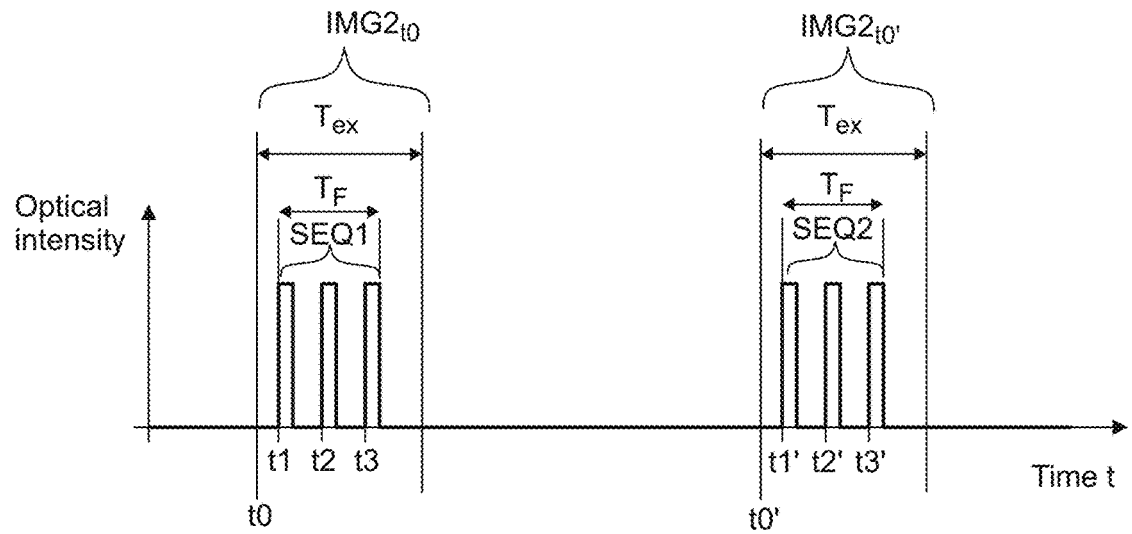
FIG. 4a shows, by way of example, timing of illuminating light pulses.
Figure 4B:
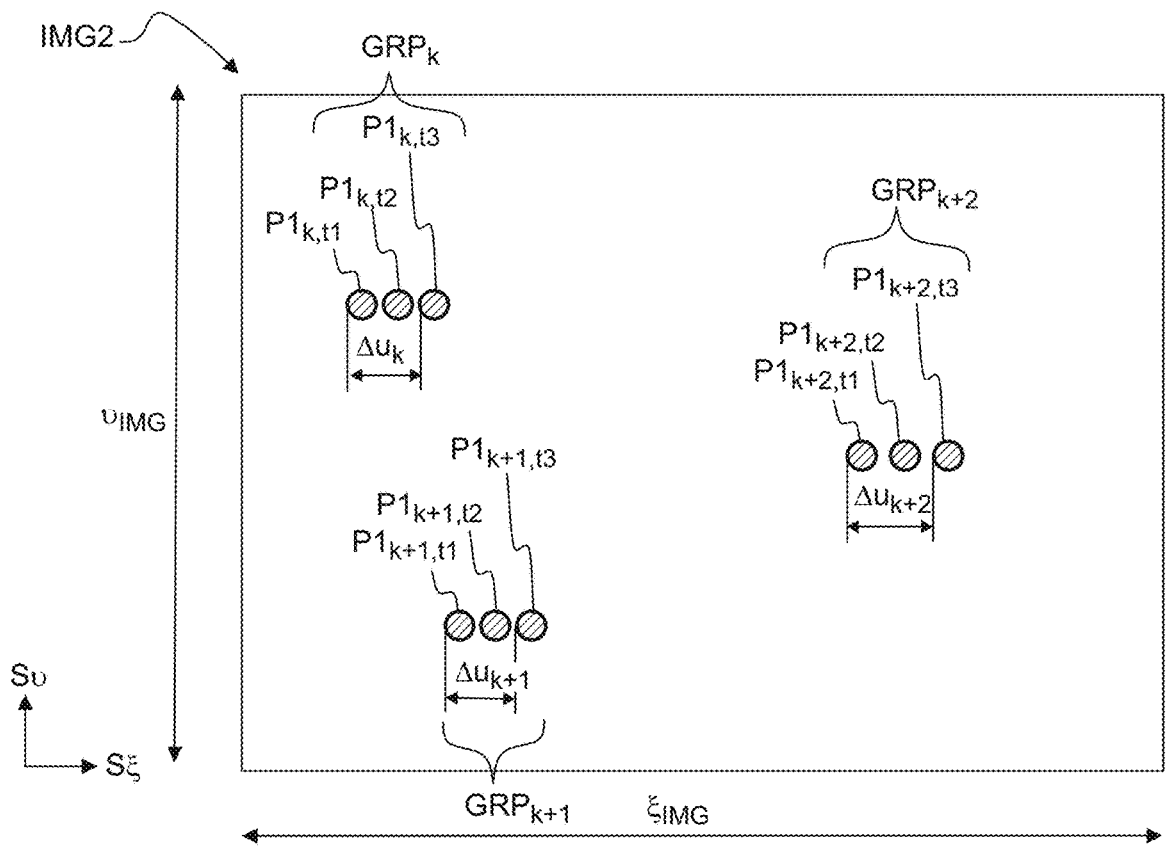
FIG. 4b shows, by way of example, an image captured by the image sensor of the measuring device.

Referring to FIGS. 4a and 4b, the imaging unit 200 may form an image P1 of each particle P0, which is located in the measurement region RG0 during an exposure time $T_{ex}$ of the image sensor SEN1. The optical image IMG1 formed on the active area ACT1 of the image sensor SEN1 may comprise a plurality of sub-images P1. Each sub-image P1 may be an image of a particle P0. The image sensor SEN1 may convert an optical image IMG1 into a digital (captured) image IMG2. A (single) captured digital image IMG2 may represent all optical images IMG1 formed on the image sensor SEN1 during the exposure time period $T_{ex}$.

The image IMG2 captured by the imaging unit 200 may represent a region RG0 of the particle jet JET0. An average number of particles appearing in a single captured image may be e.g. in the range of 2 to 1000. An average number of particles appearing in a single captured image may be e.g. in the range of 10 to 100. The sub-images P1 of the particles P0 may be detected by an image analysis algorithm. The particles P0 may be moving at a high velocity during capturing of an image IMG2. The velocity of each particle appearing in a captured image may be determined from the displacement value $\Delta u$ and from the timing of the exposure and/or illumination. The optical image P1 of each particle P0 may move during capturing of the image IMG2. The movement of the optical image may define a displacement value $\Delta u$, which may be determined from the captured image IMG2 by image analysis. Each substantially sharp image P1 of a particle P0 may be associated with a displacement value $\Delta u$. The velocity $v_k$ of a particle $P0_k$ may be determined from the displacement value $\Delta u_k$ and from the duration ($T_F$) of illumination and/or from the exposure time period $T_{ex}$.

When using illuminating pulse sequences SEQ1, SEQ2, the velocity $v_k$ of a particle $P0_k$ may be determined from the displacement value $\Delta u_k$ and from the timing (e.g. t3–t1) of illuminating light pulses LB0. In particular, the axial velocity of a particle may be substantially proportional to $\Delta u_k/T_F$.

FIG. 4a shows, by way of example, temporal evolution of optical intensity of illuminating light LB0 in the measurement region RG0.

The illuminating unit 100 may be arranged to provide pulse sequences SEQ1, SEQ2, e.g. in order to facilitate detection of the sub-images P1 by an image analysis algorithm. A pulse sequence SEQ1 may comprise e.g. two or more pulses. A first pulse sequence may comprise e.g. pulses starting at times t1, t2, t3. A second pulse SEQ2 sequence may comprise e.g. pulses starting at times t1', t2', t3'.

The particles P0 may be illuminated by a sequence SEQ1 of light pulses LB0 during an exposure time period $T_{ex}$. A first exposure time for capturing a first image $IMG2_{t0}$ may start at a time t0. A first illuminating light pulse LB0 may start at a time t1. $T_F$ may denote the duration of the illuminating light pulses LB0. A second exposure time for capturing a second image $IMG2_{t0'}$ may start at a time t0'. A second sequence SEQ2 of illuminating light pulses LB0 may start at a time t0'.

Referring to FIG. 4b, the digital image IMG2 may comprise e.g. sub-images $P1_{k,t1}$, $P1_{k,t2}$, $P1_{k,t3}$. Each sub-image $P1_k$ may be an image of a particle $P0_k$. The sub-image $P1_{k+1}$ may be an image of a particle $P0_{k+1}$. The sub-image $P1_{k+2}$ may be an image of a particle $P0_{k+2}$.

A dimension of each sub-image P1 may be substantially proportional to the velocity of the corresponding particle P0. One or more sub-images $P1_k$ may have a dimension $\Delta u_k$ in the direction S$\xi$. One or more sub-images $P1_{k+1}$ may have a dimension $\Delta u_{k+1}$. One or more sub-images $P1_{k+2}$ may have a dimension $\Delta u_{k+2}$.

The exposure time $T_{ex}$ may temporally overlap several light pulses so that each particle P0 may be represented by a group GRP, which is formed of two or more sub-images P1 appearing in the digital image IMG2. For example, the particle $P0_k$ may be represented by a first group $GRP_k$ of sub-images $P1_{k,t1}$, $P1_{k,t2}$, $P1_{k,t3}$. The distance between adjacent sub-images $P1_{k,t1}$, $P1_{k,t2}$ may depend on the velocity $v_k$ of the particle $P0_k$ and on the timing of the light pulses.

The first group $GRP_k$ of sub-images $P1_{k,t1}$, $P1_{k,t2}$, $P1_{k,t3}$ may have a dimension $\Delta u_k$ in the direction S$\xi$. A second group $GRP_{k+1}$ may have a dimension $\Delta u_{k+1}$. A third group $GRP_{k+2}$ may have a dimension $\Delta u_{k+2}$.

The sub-images may be detected e.g. by an image analysis algorithm. The device 500 may be configured to detect the sub-images by using an image analysis algorithm. The device 500 may be configured to determine the dimensions $\Delta u_k$, $\Delta u_{k+1}$, $\Delta u_{k+2}$ from one or more captured images IMG2 by using an image analysis algorithm.

The velocity of each individual particle P1 may be calculated from the dimension $\Delta u$ of the corresponding sub-image P1, and from the timing or duration $T_F$ of the illuminating light pulses LB0. For example, the velocity $v_k$ of the particle $P0_k$ may be substantially proportional to the value $\Delta u_k/T_F$.

The digital image IMG2 may have a width $\xi_{IMG}$ and a height $\upsilon_{IMG}$ in the image space defined by directions S$\xi$ and S$\upsilon$. The image of the axis AX0 may be parallel with the direction S$\xi$. The direction S$\upsilon$ may be perpendicular to the direction S$\xi$.

The width IMG may be e.g. equal to 1024 pixels, and the height $\upsilon_{IMG}$ may be e.g. equal to 512 pixels.

The velocity of the particles may also be measured by using continuous illuminating light, i.e. light, which is not pulsed. In that case the velocity $v_k$ of the particle $P0_k$ may be substantially proportional to the value $\Delta u_k/T_{ex}$.

The use of pulsed illumination may allow high instantaneous intensity and/or may allow precise timing for forming the sub-images.

Consequently, the velocity of each particle appearing in the image IMG2 may be determined by analyzing the image IMG2. The sub-images $P1_{k,t1}$, $P1_{k,t2}$, $P1_{k,t3}$ may together form a combined shape, which may facilitate reliable detection of the sub-images $P1_{k,t1}$, $P1_{k,t2}$, $P1_{k,t3}$, when analyzing the captured image IMG2. A second particle $P0_{k+1}$ may be represented by a second group $GRP_{k+1}$ formed of sub-images $P1_{k+1,t1}$, $P1_{k+1,t2}$, $P1_{k+1,t3}$.

Figure 4C:
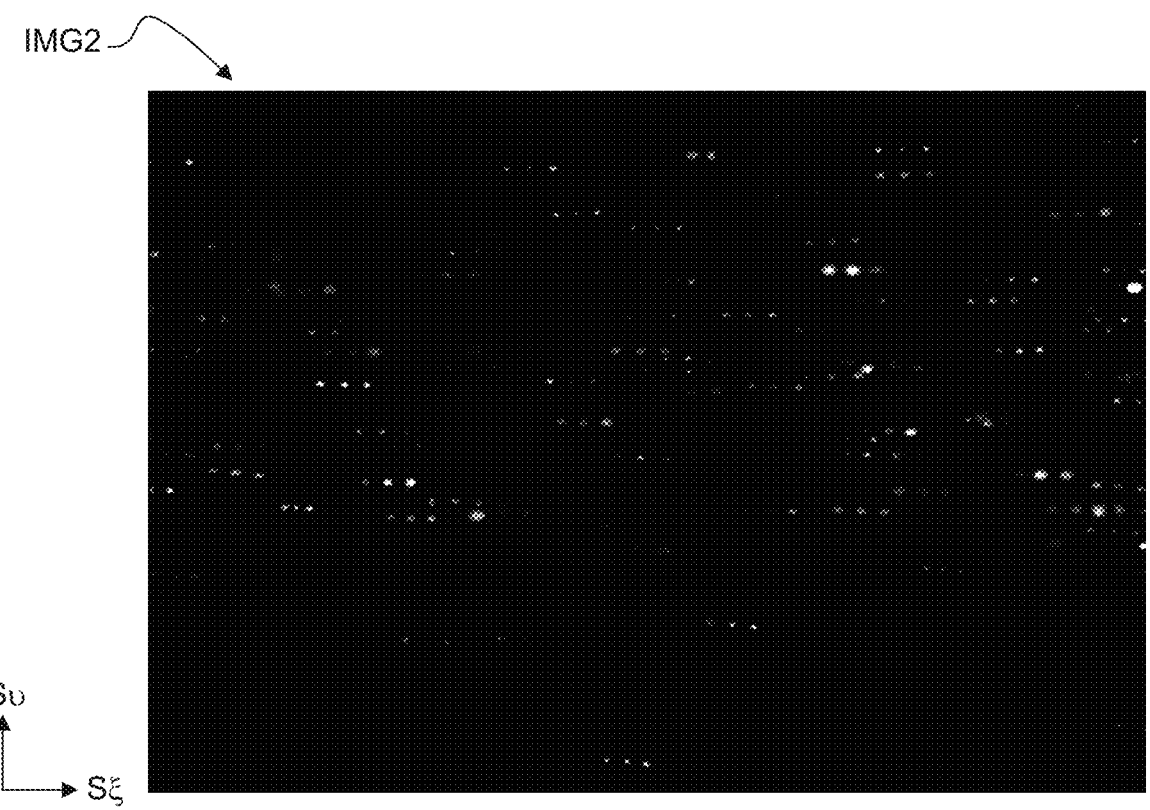
FIG. 4c shows, by way of example, an image captured by the image sensor of the measuring device.
Figure 4D:
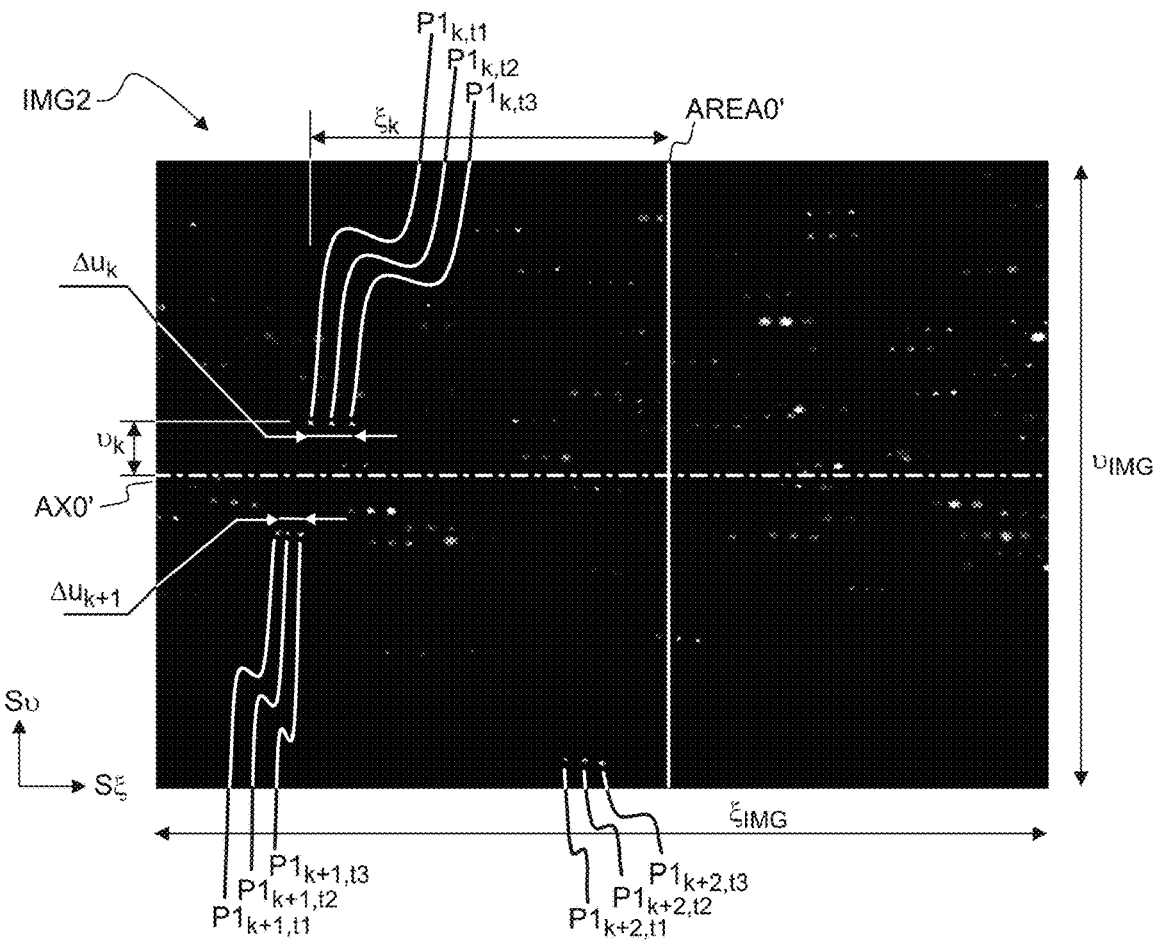
FIG. 4d shows an annotated version of the digital image of FIG. 4c.
Figure 4E:
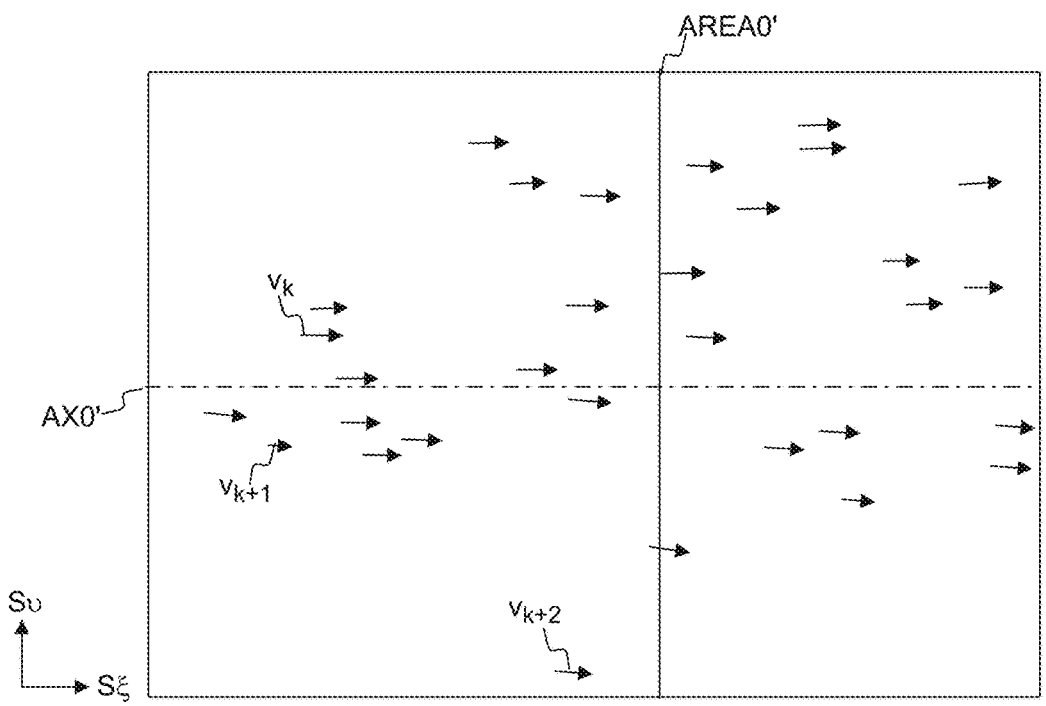
FIG. 4e shows, by way of example, particle velocity vectors determined by analyzing a captured image.

FIGS. 4c and 4d show, by way of example, a (digital) image IMG2, which was captured by using the illuminating pulse sequence. FIGS. 4c and 4d show the same captured image IMG2. When using three or more illuminating pulses, the captured image IMG2 may comprise easily discernible substantially linear groups GRP of sub-images (e.g. $P1_{k,t1}$, $P1_{k,t2}$, $P1_{k,t3}$), wherein each group GRP may represent a single moving particle (e.g. $P0_k$) which was illuminated by the pulse sequence during the exposure time period $T_{ex}$ of the captured image IMG2. The position of the first sub-image $P1_{k,t1}$ of the first group $GRP_k$ may be specified e.g. by image coordinates $(\xi_k, \upsilon_k)$. The position $(\xi_k, \upsilon_k)$ may indicate the position of the particle $P0_k$ when the image IMG2 was captured. The position $(\xi_k, \upsilon_k)$ may indicate the position of the particle $P0_k$ when the first pulse of an illuminating pulse sequence was triggered.

The velocity of the particles may be determined by analyzing the captured images. For example, the velocity of a first particle $P0_k$ may be determined from the dimension $\Delta u_k$ of a first group $GRP_k$ formed of the sub-images $P1_{k,t1}$, $P1_{k,t2}$, $P1_{k,t3}$. For example, the velocity of a second particle $P0_{k+1}$ may be determined from the dimension $\Delta u_{k+1}$ of a second group $GRP_{k+1}$ formed of the sub-images $P1_{k+1,t1}$, $P1_{k+1,t2}$, $P1_{k+1,t3}$.

The method may comprise counting the number of particles appearing in a single captured image. The method may comprise counting the number of particles appearing in the captured images. The particle density may be determined from the counted number of particles. Thus, the particle density may be determined by analyzing the captured images.

The imaging unit 200 may have a certain depth of field ($d_{12}$) such that particles which are within the depth of field may have substantially sharp sub-images on the image sensor SEN1, and particles which are outside the depth of field may have blurred sub-images on the image sensor SEN1.

Some of the sub-images (P1) shown in FIG. 4d are sharp, and some of the sub-images (P1) shown in FIG. 4d are blurred.

The groups (e.g. $GRP_k$) formed of the sub-images (e.g. $P1_{k,t1}$, $P1_{k,t2}$, $P1_{k,t3}$) may be detected by using a pattern recognition algorithm. Each particle P0 may be assumed to have a substantially constant velocity during the pulse sequence SEQ1.

A candidate group representing a particle may be accepted if the sub-images of said group are aligned in a substantially linear manner and if the distance between adjacent sub-images of said candidate group match with the timing (t1,t2,t3) of the illuminating light pulses LB0.

A candidate group may be e.g. discarded if the sub-images of said group are not aligned in a linear manner and/or if the distance between adjacent sub-images of said candidate group do not match with the timing (t1,t2,t3) of the illuminating light pulses LB0.

AX0' may indicate the position of the axis AX0 of the nozzle NOZ1. AREA0' may indicate the position of a reference area AREA0. The position of the projection of the reference area AREA0 may be indicated by a line AREA0', which may be superposed on the captured image IMG2. The position of the projection of the axis AX0 may be indicated by a line AX0', which may be superposed on the captured image IMG2.

FIG. 4e shows, by way of example, a plurality of arrow symbols, which indicate velocity vectors $v_k$, $v_{k+1}$ of particles. The velocity vectors may be determined by analyzing the captured image of FIG. 4c. The method may comprise determining the direction movement of a particle by analyzing one or more captured images. The length of each arrow symbol may be proportional to the speed of a particle, and the direction of the arrow symbol may indicate the direction of movement of the particle.

The velocity of a particle may have significant transverse component, i.e. the velocity is not always parallel with the axis AX0 of the jet. The velocity $v_k$ of a particle may have an axial component $v_{k,y}$, a lateral component $v_{k,x}$, and a transverse component $v_{k,z}$. The axial component $v_{k,z}$ is parallel with the axis AX0. The lateral component $v_{k,x}$ and the transverse component $v_{k,y}$ are perpendicular to the axis AX0. To the first approximation, the kinetic energy of each particle may be calculated from the axial component, by omitting the lateral and transverse components. To the first approximation, the capability of a particle $P0_k$ to adhere to the target object TARG1 may depend on the axial velocity component of said particle. Velocity values ($v_{RMS}$, $v_{AVE}$) may be determined from the axial velocity values of the individual particles P0. The axial velocity values of the individual particles P0 may be determined from the captured images.

$v_{AVE}$ denotes the average velocity of particles which pass through a reference area (AREA0) during a measurement time period. To the first approximation, the number density of particles in the jet may be inversely proportional to the average velocity $v_{AVE}$ of the particles, in a situation where the mass flow rate of the particles is substantially constant. The average velocity $v_{AVE}$ may be determined by analyzing the images captured by the measuring device during the measurement time period. A determined velocity distribution may indicate e.g. the average velocity $v_{AVE}$ as a function of lateral position x or as a function of transverse position z.

Also a RMS velocity value $v_{RMS}$ may be determined by analyzing the captured images IMG2. RMS means root mean square. The RMS velocity value $v_{RMS}$ may be indicative of a mean kinetic energy of particles.

The method may comprise determining a width and/or a radial dimension of the particle jet JET0 by analyzing the captured images IMG1.

One or more operating parameters of the monitoring device 500 itself may be adjusted and/or optimized, based on the analysis of the images. For example, the temporal width $T_F$ of a pulse sequence SEQ1 may be adjusted based on an average velocity of detected particles. For example, the intensity of illuminating light LB0 may be increased or reduced based on brightness of the sub-images P1 of a captured image IMG1. For example, the temporal width of each illuminating pulse may be increased or reduced based on brightness of the sub-images P1 of a captured image IMG1. For example, a step size for moving the object plane O1 with respect to the nozzle NOZ1 may be selected based on a number of detected particles appearing in a captured image. The step size for a movement may also be determined e.g. by analyzing one or more determined distributions (F1(x), F2(z)). The position of the object plane O1 may be changed according to the determined step size. For example, the step size may be determined so as to gather data related to an abnormal region of a distribution.

Figure 4F:
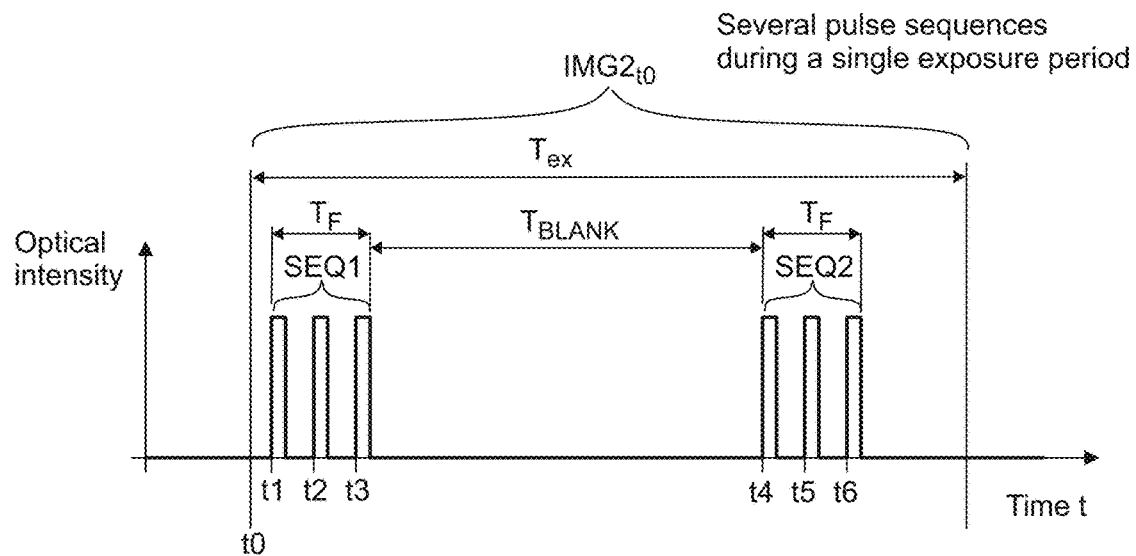
FIG. 4f shows, by way of example, timing of illuminating light pulses when providing several pulse sequences during a single exposure time period.

Referring to FIG. 4f, the device 500 may be arranged to provide two or more pulse sequences SEQ1, SEQ2 during the exposure time period $T_{ex}$ of a single image IMG2. Each sequence SEQ1, SEQ2, . . . may comprise e.g. three or more illuminating light pulses. Consecutive sequences may be separated by a blanking time period $T_{BLANK}$. For example, a first sequence SEQ1 may comprise illuminating light pulses LB0 emitted at times t1, t2, t3, and a second sequence SEQ2 may comprise illuminating light pulses LB0 emitted at times t4, t5, t6.

The method may comprise:
- capturing images IMG2 by providing only two or more pulse sequences SEQ1, SEQ2 during an exposure time period $T_{ex}$ of each single image IMG2, and
- determining one or more distributions by analyzing the second images IMG2.

The device 500 may be arranged to provide several sequences SEQ1, SEQ2 during a single exposure time period $T_{ex}$ e.g. in order to increase the number of detected particles. The illuminating unit 100 may be arranged to provide several sequences SEQ1, SEQ2 during the single exposure time period $T_{ex}$ e.g. in order to increase the number of detected particles in a situation where a number of particles detected in captured images IMG2 is lower than a predetermined limit. The exposure time period $T_{ex}$ may be increased to increase the number of detectable particles.

Image capturing may take time, and image analysis may take time. Increasing the number of detectable particles in a single image may facilitate image analysis. Increasing the number of particles detectable in a single image may facilitate the image analysis such that the total number of detected particles may be increased even in a situation where total number of captured images would be lower due to a longer exposure time period $T_{ex}$.

The method may comprise:
- capturing first images IMG2 by providing only one pulse sequence SEQ1 during an exposure time period $T_{ex}$ of each single image IMG2,
- counting a first number NUM1 of detected particles in the first images IMG2,
- comparing the first number with a first limit value LIM1,
- capturing second images IMG2 by providing only two or more pulse sequences SEQ1, SEQ2 during an exposure time period $T_{ex}$ of each single image IMG2 if the first number NUM1 of detected particles is lower than the first limit value LIM1, and
- determining one or more distributions by analyzing the second images IMG2.

The blanking time period $T_{BLANK}$ between consecutive sequences SEQ1, SEQ2 may be selected to be long enough such that each moving particle P0 may provide only one group GRP of sub-images P1 appearing in the digital image IMG2, so as to facilitate image analysis.

The blanking time period $T_{BLANK}$ between consecutive sequences SEQ1, SEQ2 may be selected to be long enough such that the slowest moving particle appearing in the image IMG2 may provide only one group GRP of sub-images P1 appearing in the digital image IMG2.

The blanking time period $T_{BLANK}$ between consecutive sequences SEQ1, SEQ2 may be selected to be long enough such that even the slowest moving particle illuminated by the first sequence SEQ1 in the measuring region RG0 may have sufficient time to move out of the measuring region RG0 before start of the second sequence SEQ2. The ratio $T_{ex}/T_F$ may be selected to be greater than or equal to the ratio $\xi_{IMG}/\Delta u_{MIN}$.

Illuminating a (slow) particle P0 with the first sequence SEQ1 may provide a group GRP of sub-images P1 appearing in the image IMG2. The symbol $T_F$ may denote the temporal width of the first pulse sequence SEQ1. The symbol $\Delta u_{MIN}$ may denote the displacement value of the group GRP of sub-images P1 of the (slow) particle P0. The symbol $\xi_{IMG}$ may denote the width of the image IMG2.

FIG. 5 shows, by way of example, a probability density function $p_v(v)$ obtained by fitting a regression function to velocity values determined from captured images. The method may comprise fitting a regression function to the measured data. The probability density function $p_v(v)$ may be optionally normalized such that the integral of the probability density function $p_v(v)$ over all possible velocities is equal to one. The probability density function $p_v(v)$ may represent a measured velocity distribution of the particles at a given point of the jet JET0. The probability density function $p_v(v)$ may have a peak value $p_{MAX}$ associated with a velocity $v_{PEAK}$. The velocity $v_{PEAK}$ may denote the most probable velocity of the particles P0. The velocity distribution $p_v(v)$ may have a width $\Delta v_{FWHM}$, which may be defined by a first velocity and a second velocity $v_H$. The velocities $v_L$, $v_H$ may be selected such that the velocity distribution $p_v(v)$ is equal to 50% of the maximum value $p_{MAX}$ at the velocities $v_L$ and $v_H$.

Figure 6:
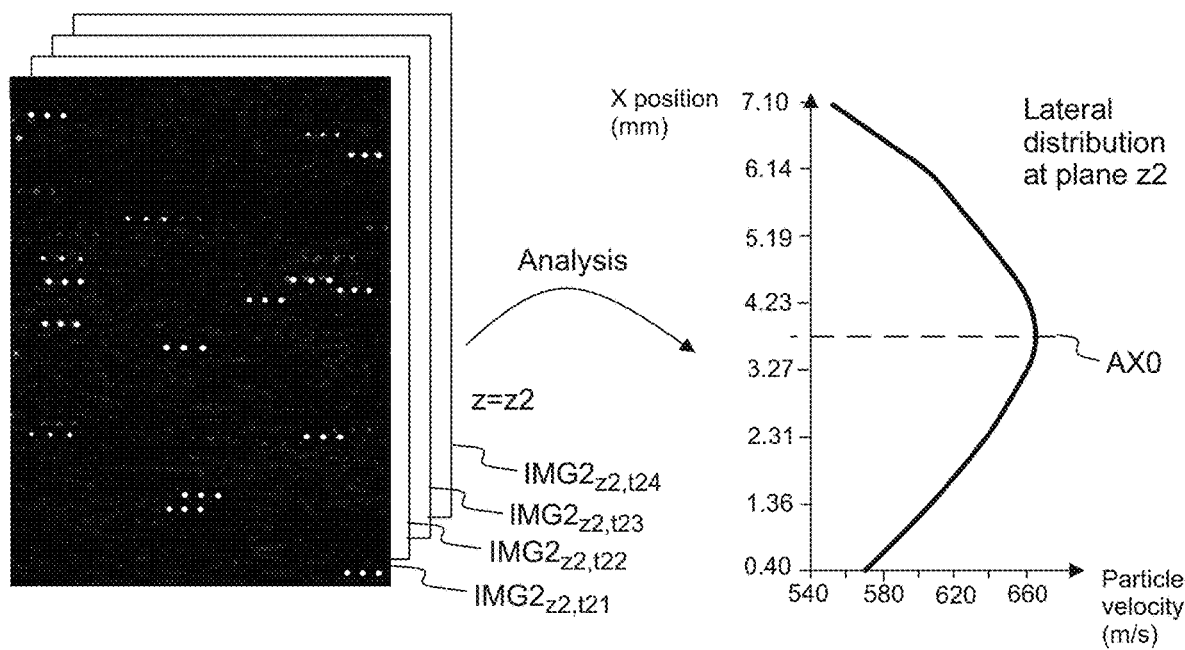
FIG. 6 shows, by way of example, determining one or more distributions by analyzing captured images.

Referring to FIG. 6, the method may comprise capturing and analyzing a plurality of images at a position (e.g. z=z2), so as to determine a distribution based on a sufficient number of detected particles.

For example, a distribution $F1_2(x)$ may be determined by analyzing a group of images $IMG2_{z2,t21}$, $IMG2_{z2,t22}$, $IMG2_{z2,t23}$, $IMG2_{z2,t24}$ captured when the object plane O1 is at a transverse position z=z2 with respect to the axis AX0. The distribution $F1_2(x)$ may be e.g. a lateral velocity distribution, which indicates particle mean velocity $v_{AVE}(x)$ as a function of lateral position x.

Figure 7:
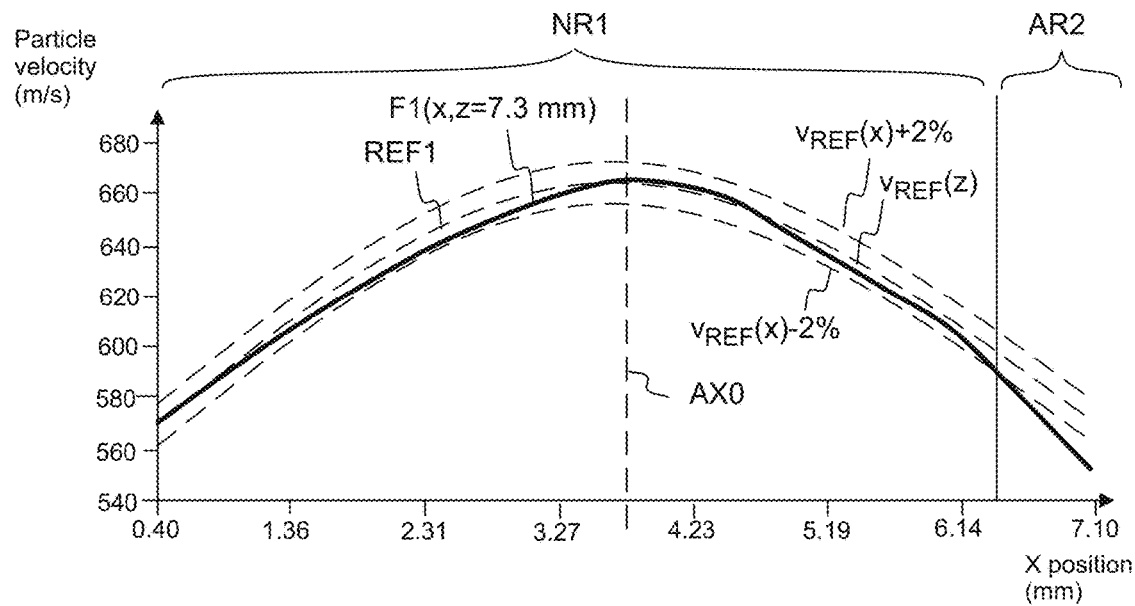
FIG. 7 shows, by way of example, comparing a determined distribution with a reference distribution.

Referring to FIG. 7, the method may comprise comparing a determined distribution $F1(x)$ with a reference distribution REF1. The reference distribution REF1 may be e.g. velocity distribution $v_{REF}(x)$, which indicates a mean velocity as a function of lateral position x. For example, comparison of the distribution $F1(x)$ with a reference distribution REF1 may indicate that average particle velocity in a portion of the particle jet JET0 is abnormally high. The symbol AR2 may denote an abnormal region of the distribution, and the symbol NR1 may denote a normal region of the distribution. The abnormal region AR2 may be e.g. a region where the determined distribution substantially deviates from a reference distribution REF1.

The method may comprise adjusting one or more operating parameters PAR1 of the cold spraying process based on the result of the comparison. For example, a relative position of the feeding nozzle NOZ2 with respect to the accelerating nozzle NOZ1 may be adjusted so as to provide a desired distribution $F1(x)$. For example, one or more flow rates of the spraying apparatus may be adjusted so as to provide a desired velocity distribution.

The method may comprise classifying a cold spraying operation as valid or invalid by checking whether a measured distribution substantially matches with a reference distribution or not.

Figure 8:
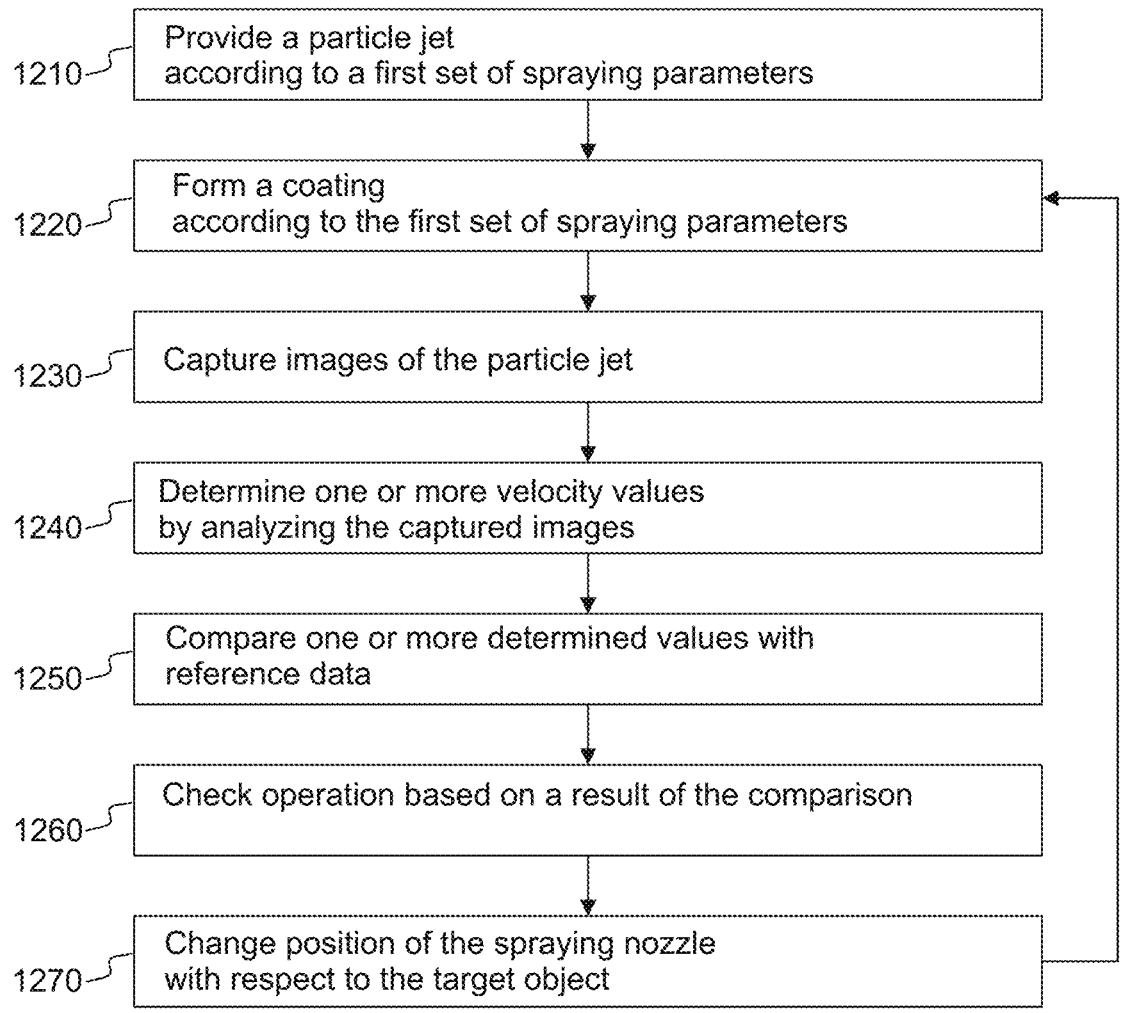
FIG. 8 shows, by way of example, method steps for determining one or more velocity values by analyzing captured images, and for controlling operation of the cold spraying apparatus based on the one or more determined velocity values.

FIG. 8 shows, by way of example, method steps for controlling cold spraying. In particular, the method of FIG. 8 may be used for substantially continuous monitoring of cold spraying during a coating operation.

The spraying apparatus 1000 may be arranged to provide a particle jet JET0 according a first set of operating parameters (PAR1) in step 1210.

A coating may be formed on a target object TARG1 according to the first set of operating parameters (PAR1) in step 1220.

One or more images IMG2 of the measuring region RG0 may be captured during the coating when the measuring region RG0 is illuminated with illuminating light pulses LB0 (step 1230).

One or more velocity values (e.g. average velocity $v_{AVE}$) may be determined by analyzing the captured images IMG2 (step 1240).

One or more determined velocity values may be compared with reference data REF1 in step 1250.

Proper operation of the cold spraying apparatus 1000 may be checked based on a result of said comparison in step 1260. The device 500 may e.g. provide an indication e.g. via the user interface UI F1 if one or more measured velocity values (e.g. $v_{AVE}$) are outside an acceptable range. The device 500 may e.g. provide an alarm if one or more measured velocity values (e.g. $v_{AVE}$) are outside an acceptable range. The device 500 may be arranged to interrupt operation of the spraying gun GUN1 if one or more measured velocity values (e.g. $v_{AVE}$) are outside an acceptable range.

The position of the accelerating nozzle NOZ1 may be changed with respect a target object TARG1 (step 1270). The imaging unit 200 and the illuminating unit 110 may be attached to the spraying gun GUN1 such that the position of the object plane O1 may remain fixed with respect to the moving nozzle NOZ1.

The steps 1220, 1230, 1240, 1250, 1260, 1270 may be repeated e.g. until a coating operation has been finished.

The method may comprise verifying operation of the apparatus based on the result of the comparison. The verification may comprise e.g. determining whether one or more determined distributions are outside a specified range. A spraying operation may be determined to be invalid e.g. when at least one determined distribution is outside a specified range. A spraying operation may be determined to be valid e.g. when each relevant determined distribution is within a specified range.

Figure 9A:
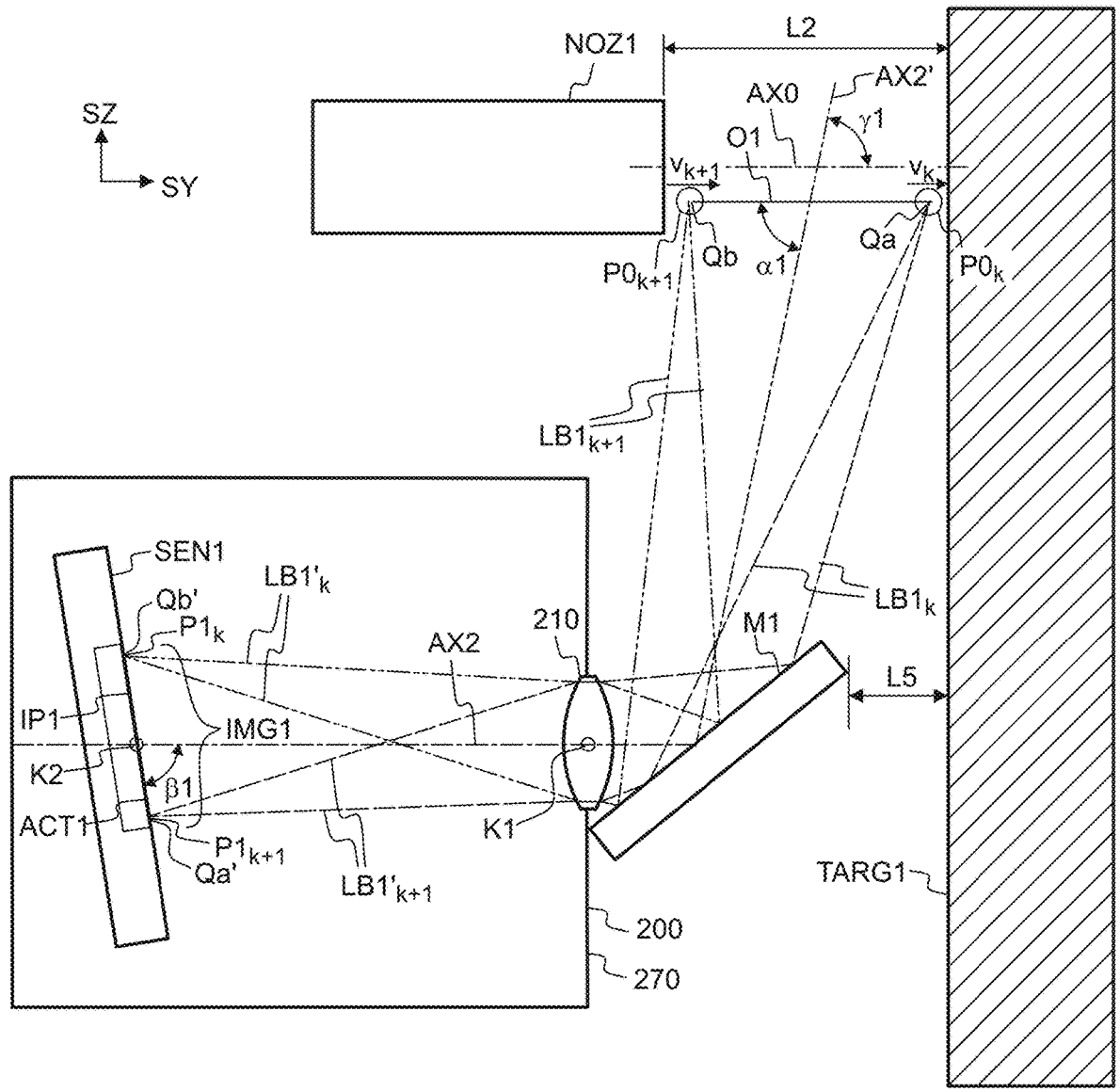
FIG. 9a shows, by way of example, in a side view, monitoring the particle jet by using a folded optical axis and by using an inclined orientation of the image sensor.
Figure 9B:
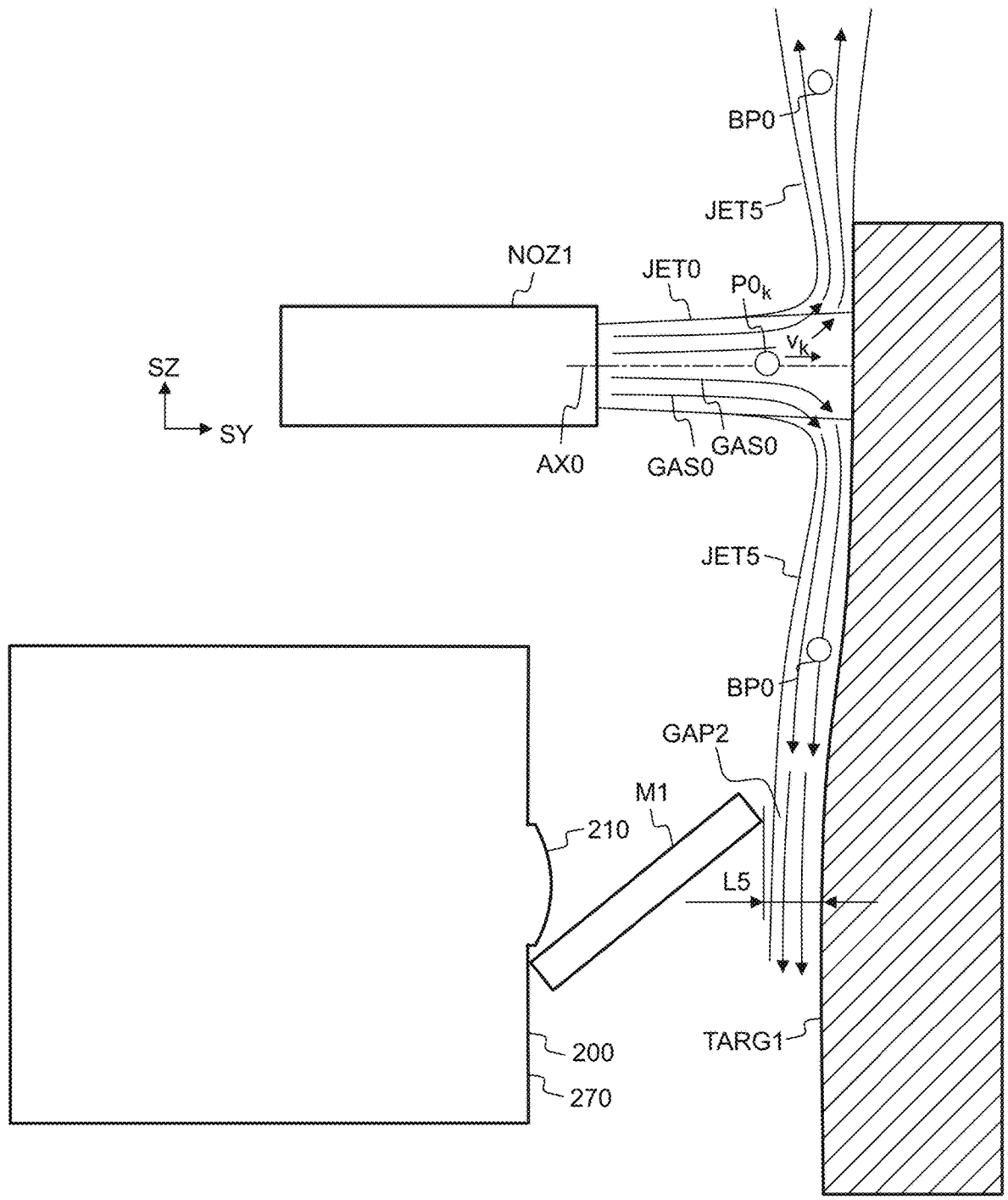
FIG. 9b shows, by way of example, in a side view, a gap between the imaging unit of FIG. 9a and the target.

Referring to FIGS. 9a and 9b, the device 500 may comprise one or more beam deflecting elements M1 to provide a folded imaging set-up. The beam deflecting element M1 may be e.g. a mirror, a prism or a diffractive grating. A diffractive grating may be used as a deflecting element M1 e.g. when using monochromatic illumination LB0.

The beam deflecting element M1 may provide a folded optical axis AX2' by deflecting light $LB1_k$, $LB1_{k+1}$ detected by the imaging unit 200. The folded optical axis AX2' may be inclined with respect to the object plane O1, and the folded optical axis AX2' may be inclined with respect to the axis AX0 of the nozzle NOZ1.

An angle γ1 between the central axis AX0 of the nozzle NOZ1 and the folded optical axis AX2' of the imaging unit 200 may be e.g. in the range of 45° to 85°, advantageously in the range of 70° to 80°.

Using the folded imaging set-up may further facilitate monitoring the particle jet in a confined space and/or in a situation where the coating is formed on a convex surface of a target object.

The image sensor SEN1 may be inclined with respect to the optical axis AX2 in order to provide an object plane O1, which is substantially parallel with the average direction of movement of the particles P0.

An angle β1 between the sensor plane of the image sensor SEN1 and the optical axis AX2 of the imaging unit 200 may be e.g. in the range of 65° to 89°, advantageously in the range of 75° to 85°. An angle (90°−β1) between the surface normal of the image sensor SEN1 and the optical axis AX2 of the imaging unit 200 may be e.g. in the range of 1° to 25°, advantageously in the range of 5° to 15°, respectively.

Referring to FIG. 9b, the inclined image sensor may also provide a protective gap GAP2 between the beam deflecting element M1 and the target object TARG1. The gap GAP2 may reduce a heating and/or contaminating effect of the wall jet JET5. The gap GAP2 may also be useful e.g. when forming monitoring a coating process where surface of the target TARG1 has convex and/or concave regions.

Figure 9C:
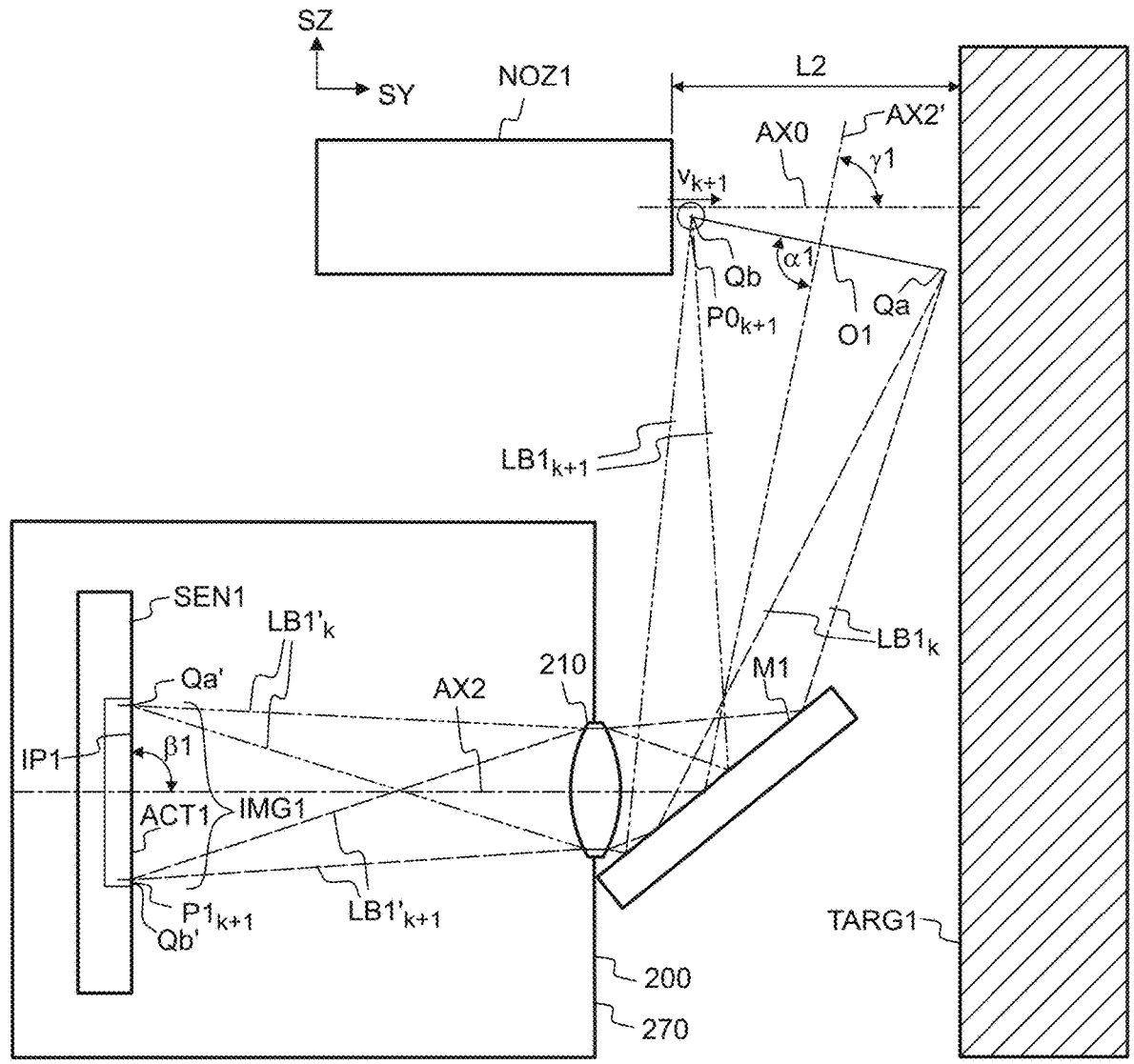
FIG. 9c shows, by way of example, in a side view, monitoring the particle jet by using a folded optical axis and by using a perpendicular orientation of the image sensor.

FIG. 9c shows a comparative example where the image sensor SEN1 is perpendicular to the optical axis AX2. The folded optical axis AX2 is inclined with respect to the velocity vector $v_{k+1}$, wherein the object plane O1 is perpendicular to the folded optical axis AX2'. The object plane O1 is inclined with respect to the velocity vector $v_{k+1}$ of a particle $P0_{k+1}$. The optical image $P1_{k+1}$ of the particle $P0_{k+1}$ may remain sharp only during a very short period of time. The time period may be so short that it may be difficult to reliably detect the particle $P0_{k+1}$ by analyzing a captured image. The time period may be so short that it may be difficult to accurately measure the velocity $v_{k+1}$ of the particle $P0_{k+1}$ by analyzing a captured image.

Gas dynamic cold spraying may mean forming a coating on a target by a method, which comprises accelerating coating material particles e.g. with a gas jet, and which comprises causing the particles to impact on the target object such that the particles undergo plastic deformation and adhere to the target. The velocity of the particles may be e.g. greater than 400 m/s. The velocity of the particles may be e.g. in the range of 400 m/s to 1200 m/s.

The kinetic energy of a coating particle may cause deformation of the particle and/or local deformation of the surface of the target when the coating particle impacts on the target. The maximum temperature of the particles, when moving in the particle jet, may remain substantially below melting temperature of the material of the particles. The diameter of the particles may be e.g. in the range of 1 to 100 μm. The suitable size range of the particles may depend on the material of the particles and/or on the material of the target. A large target may be coated e.g. by moving the central axis of the particle jet with respect to the target. The material of the coating particles may be e.g. a metal, polymer, ceramic. composite material. The material of the particles may be polycrystalline.

The particles may be accelerated by introducing the particles into a high velocity gas jet. The gas jet may be provided e.g. by guiding pressurized and heated gas into a diverging nozzle, in order to accelerate the gas and the particles to supersonic velocities. Supersonic velocity means a velocity which is higher than the speed of sound. In particular, the diverging nozzle may be a de Laval nozzle. The gas of the accelerating gas jet may be e.g. helium or nitrogen. The speed of sound in nitrogen at 20° C. is 349 m/s. The speed of sound in helium at 20° C. is 1007 m/s. Using helium as the accelerating gas may provide higher particle velocities. The temperature of the gas may be e.g. in the range of 500° C. to 900° C. The parameters of the coating process may be selected so as to provide plastic deformation of the particles at the impact, wherein the maximum temperature of the particles, when moving in the particle jet, may remain below the melting temperature of the material of the particles.

The temperature of the particles P0 may be so low that thermal radiation emitted from the particles does not significantly contribute to the images captured by the image sensor SEN1. The imaging unit 200 may optionally comprise an optical filter to reject thermal radiation emitted from the particles P0.

The method may comprise selecting one or more operating parameters of the coating process. The operating parameters may include e.g. gas pressure, gas temperature, particle size, material of the particles, dimensions of the nozzle, material of the target, distance between the nozzle and/or the target, transverse speed of the nozzle with respect to the target.

Cold spraying may also be used for producing an object by additive manufacturing. The produced object may comprise or consist essentially of the material of the coating particles.

For the person skilled in the art, it will be clear that modifications and variations of the devices and the methods according to the present disclosure are perceivable. The figures are schematic. The particular embodiments described above with reference to the accompanying drawings are illustrative only and not meant to limit the scope of the disclosed embodiments, which is defined by the appended claims.

The invention claimed is:

1. A method for controlling gas dynamic spraying, the method comprising:
    providing a particle jet by using an accelerating nozzle,
    illuminating the particle jet with illuminating light pulses,
    capturing images of the particle jet illuminated with the illuminating light pulses, and
    determining one or more velocities of particles of the particle jet by analyzing the captured images,
    wherein the images are captured by using an imaging unit which comprises imaging optics to form an optical image of an object plane on an image sensor by focusing light, wherein an optical axis of the imaging unit is inclined with respect to a central axis of the nozzle, wherein the image sensor is inclined with respect to the optical axis such that the object plane is substantially parallel with a direction of movement of particles of the particle jet, and wherein the image sensor is inclined with respect to the optical axis such that the angle between the surface normal of the image sensor and the optical axis is substantially different from zero.

2. The method of claim 1, wherein the accelerating nozzle is arranged to provide the particle jet such that at least 80% of the particles of the particle jet move at velocities higher than 400 m/s, and wherein the temperatures of the particles of the particle jet are below 1000° C.

3. The method of claim 1, wherein a depth-of-field of the imaging unit is smaller than or equal to 2 mm.

4. The method according to claim 1, wherein the depth-of-field of the imaging unit is in the range of 2% to 40% of a width of the particle jet at an outlet end of the nozzle.

5. The method according to claim 1, wherein an actuator is arranged to move a combination of the accelerating nozzle and the imaging unit with respect to a target object such that a distance between the object plane and the central axis of the nozzle remains constant during said moving.

6. The method according to claim 1, wherein an angle between the central axis of the nozzle and the optical axis of the imaging unit is in the range of 45° to 85°.

7. The method according to claim 1, wherein an angle between the sensor plane of the image sensor and the optical axis of the imaging unit is in the range of 65° to 89°.

8. The method according to claim 1, wherein the particle jet is illuminated by a sheet of illuminating light, wherein the sheet of illuminating light overlaps the object plane of the imaging unit such that the sheet of illuminating light is substantially parallel with the object plane.

9. The method according to claim 1, wherein a distance between the object plane and the imaging optics is in the range of 5 to 50 times the transverse width of the particle jet at an outlet end of the nozzle.

10. The method according to claim 1, comprising determining a position of a central axis of the particle jet based on the one or more determined velocities, and controlling moving the particle jet with respect to a target object according to the determined position of the central axis of the particle jet.

11. The method according to claim 1, comprising comparing the one or more determined velocities with reference data, and adjusting one or more operating parameters of the cold spraying process based on the result of the comparison.

12. The method according to claim 1, comprising comparing the one or more determined velocities with reference data, and
    validating or rejecting a cold spraying operation based on the result of the comparison.

13. The method according to claim 1, comprising forming a coating on a target object.

14. The method according to claim 1, further comprising determining one or more distributions by analyzing the captured images, wherein at least one of the determined distributions is a particle velocity distribution or a particle number density distribution.

15. The method of claim 1, wherein a depth-of-field of the imaging unit is in the range of 0.1 mm to 1.0 mm.

16. The method according to claim 1, wherein an angle between the central axis of the nozzle and the optical axis of the imaging unit is in the range of 70° to 80°.

17. The method according to claim 1, wherein an angle between the sensor plane of the image sensor and the optical axis of the imaging unit is in the range of 75° to 85°.

18. A cold spraying apparatus, comprising:
    an accelerating nozzle to provide a particle jet,
    an illuminating unit to illuminate the particle jet with illuminating light pulses,
    an imaging unit to capture images of the particle jet, and
    a data processing unit to determine one or more velocities of particles of the particle jet by analyzing the captured images,
    wherein the imaging unit comprises an image sensor, and imaging optics to form an optical image of an object plane on the image sensor by focusing light, wherein an optical axis of the imaging unit is inclined with respect to a central axis of the nozzle, wherein the image sensor is inclined with respect to the optical axis such that the object plane is substantially parallel with an average direction of movement of the particles of the particle jet, and wherein the image sensor is inclined with respect to the optical axis such that the angle between the surface normal of the image sensor and the optical axis is substantially different from zero.

* * * * *